US006618389B2

(12) United States Patent
Hoefelmeyer et al.

(10) Patent No.: US 6,618,389 B2
(45) Date of Patent: Sep. 9, 2003

(54) VALIDATION OF CALL PROCESSING NETWORK PERFORMANCE

(75) Inventors: Ralph L. Hoefelmeyer, Colorado Springs, CO (US); Michael L. Hutchinson, Monument, CO (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/877,890

(22) Filed: Jun. 8, 2001

(65) Prior Publication Data

US 2002/0172158 A1 Nov. 21, 2002

Related U.S. Application Data

(63) Continuation-in-part of application No. 09/444,099, filed on Nov. 22, 1999, now Pat. No. 6,385,204.

(51) Int. Cl.[7] .............................................. H04L 12/56
(52) U.S. Cl. ...................................................... 370/401
(58) Field of Search ................................. 370/401–404, 370/352–356, 233, 254, 469, 475, 389–395; 379/220, 230, 114.01, 114.09, 221.01; 709/222, 250, 244

(56) References Cited

U.S. PATENT DOCUMENTS

| 5,790,634 | A | | 8/1998 | Kinser, Jr. et al. |
|---|---|---|---|---|
| 5,838,683 | A | | 11/1998 | Corley et al. |
| 5,982,780 | A | | 11/1999 | Bohm et al. |
| 6,012,152 | A | | 1/2000 | Douik et al. |
| 6,091,708 | A | * | 7/2000 | Matsunuma ................. 370/233 |
| 6,091,732 | A | | 7/2000 | Alexander, Jr. et al. |
| 6,122,363 | A | * | 9/2000 | Friedlander et al. ........ 379/230 |
| 6,137,874 | A | * | 10/2000 | Brown et al. ................ 379/220 |
| 6,172,981 | B1 | | 1/2001 | Cox et al. |
| 6,182,125 | B1 | | 1/2001 | Borella et al. |
| 6,295,292 | B1 | * | 9/2001 | Voit et al. .................... 370/352 |

* cited by examiner

Primary Examiner—Kwang Bin Yao
Assistant Examiner—Prenell Jones

(57) ABSTRACT

A call processing network performance verification and validation system and test methodology. The call processing network implements Internet Protocol (IP) subnet topology, ATM WAN configuration, equipment placement, and device configuration to provide partitioning of a call processing application across multiple sites. The partitioning reduces latency for mission critical messages, while providing for necessary provisioning traffic needs. Further, the overall topology provides the redundancy and resiliency necessary for mission critical call processing application, utilizing the IP subnets, ATM permanent virtual circuits, network device configuration, and server segregation to achieve Quality of Service (QoS). The validation testing method and system proves out the various segregated routes, verifies subnet integrity and measures total latency and data path traversal in a verifiable manner.

27 Claims, 18 Drawing Sheets

Case 514 (with delay) - CS-TS-ATS-remote-GDS, 204 byte messages, 100 messages, 10 ms interval Average=129 ms 90%ile=230 ms Case 514 (no delay) - CS-TS-ATS-remote GDS R/T traffic, 204 byte messages, 100 messages, 10 ms interval Average=2.54 ms 90%ile=2.50 ms Case 517 (with delay) SS-remote RS over PVC3 on WAN, 7 Mbytes per messages, 10 messages, Average=5.72 s, 90%ile=5.88 s Case 517 (no delay) SS-remote RS over PVC3 on WAN, 7 Mbytes per messages, 10 messages, Average=5.47 s, 90%ile=5.61 s

VALIDATION OF CALL PROCESSING NETWORK PERFORMANCE

CROSS-REFERENCE TO RELATED APPLICATIONS

The following patent application is a continuation-in-part of U.S. application Ser. No. 09/444,099, entitled "Network Architecture and Call Processing System," filed Nov. 22, 1999, now U.S. Pat. No. 6,385,204.

FIELD OF THE INVENTION

The present invention relates generally to call processing network design architectures, and particularly, to a test system and methodology for verifying performance of an IP based LAN/WAN network architecture implementing Internet Protocol (IP) subnet topology, Asynchronous Transfer Mode (ATM) WAN configuration, and network devices configured for partitioning a call processing application across multiple LAN sites.

BACKGROUND OF THE INVENTION

There exist many types of networks and shared information communications systems. From a hierarchical standpoint, network topologies typically comprise a plurality of local area networks (LANs), such as Ethernet, which, depending upon the amount of users, location and amount of traffic, may be further interconnected locally with a high-speed backbone network, such as backbone fiber distributed data interface (FDDI), and asynchronous transfer mode (ATM) backbone networks. Multiple LANs owned by a single entity and geographically dispersed, may be interconnected via wide area networks (WANs) for long distance information transport. Such WAN transport technologies may include dial-up private networks, switched digital services, leased-lines, packet-switching and frame-relay services, cell relay, and public packet-switched network such as the Internet. It is understood that each type of network is capable of carrying different types of information: data, voice, multimedia including audio and video data. As known, ATM networks in particular, are connection oriented and capable of achieving certain quality of service (QoS) guarantees so that data, e.g., video, is transported across networks to their destinations in a timely manner. Other QoS guarantees include bandwidth control, prioritization of selected traffic, and traffic security.

In the telecommunications industry, there exist many types of call processing networks and network topologies for carrying prevalent types of traffic such as real-time call processing traffic, e.g., for toll-free number calls, and ATM provisioning traffic, e.g., for other types of prioritized traffic. Each of these traffic types have differing latency and processing requirements. In order to meet these differing requirements, it is advantageous to provide an overall network topology that is physically and logically partitioned to enable traffic segregation within a LAN and WAN, as desired, such that specific traffic types may be segregated to specific interfaces on network devices, and that specific traffic types may be delivered in the most mission efficient manner.

Furthermore, current call processing network/system validation techniques comprise server to server validation, or validation of network device to network device latencies and paths. Consequently, it is highly desirable to provide a comprehensive system and method designed to verify that an IP based LAN/WAN network architecture implementing Internet Protocol (IP) subnet topology, Asynchronous Transfer Mode (ATM) WAN configuration, and network devices configured for partitioning a call processing application across multiple LAN sites, meets latency requirements and routes data as required by a functional call processing application.

SUMMARY OF THE INVENTION

Commonly owned, co-pending U.S. patent application Ser. No. 09/444,099 describes a novel call processing and call traffic provisioning network architecture that includes an IP based network LAN/WAN design implementing Internet Protocol (IP) subnet topology that may be configured to provide redundancy, reduce latency for mission critical call processing messages, and provide for all necessary traffic provisioning needs. Particularly, the aforementioned call processing and provisioning network topology makes use of subnets, so that traffic may be segregated within a LAN/WAN as desired and allowing for the assignment of specific traffic types to specific interfaces on network devices, e.g., allowing traffic to be directed to specific permanent virtual circuits (PVCs) in an ATM WAN. Each PVC is to be further configured using priority rate queuing enabling delivery of specific traffic types in the most mission efficient manner.

The present invention is directed to a system test and methodology for validating the performance of the novel IP based network LAN/WAN design implementing Internet Protocol (IP) subnet topology. Preferably, the system integrates server to server routing, modeling the application's data route through an application network, in combination with the LAN/WAN network's routing, through subnets, to verify subnet integrity, total latency, and data path traversal in a verifiable manner. Particularly, the method of the invention validates the round trip latencies by traversing each application server in the designated routes and order, as well as traversing the required network devices. The transition between subnets and the validation of network device configurations is proved out as well.

Thus, in accordance with the invention, there is provided a system and method for validating a telecommunications call processing network comprising: a call processing network including a variety of application servers and network devices for simulating handling of call processing traffic along first segregated routes comprising one or more subnets between associated network devices, and handling of call provisioning traffic along second segregated routes comprising one or more subnets, the first and second segregated routes segregated according to call traffic latency requirements; test tool capable of communicating test information packets along selected segregated routes in the call processing network; and a mechanism for measuring round trip latencies of communicated packets along the selected segregated routes, whereby internetwork and intranetwork latency and subnet integrity for simulated packet traffic is verified.

Advantageously, the method and system of the invention may be used for the validation of call processing networks and applications and particularly, of any system involving servers and network devices in a LAN/WAN. Thus, call processing networks may be validated prior to them being built.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

BRIEF DESCRIPTION OF DRAWINGS

FIGS. 5(*b*) and 5(*c*) illustrate the packet delay results incurred for the example tests of measuring the round trip times according to the test configuration of FIG. 5(*a*) with a delay option (FIG. 5(*b*)) and no-delay option (FIG. 5(*c*)).

FIGS. 6(*b*) and 6(*c*) illustrate the packet delay results incurred for the example tests of measuring the round trip times according to the test configuration of FIG. 6(*a*) with a delay option (FIG. 6(*b*)) and no-delay option (FIG. 6(*c*)).

FIGS. 7(*b*) and 7(*c*) illustrate the packet delay results incurred for the example tests of measuring the round trip times according to the test configuration of FIG. 7(*a*) with a delay option (FIG. 7(*b*)) and no-delay option (FIG. 7(*c*)).

FIGS. 8(*b*) and 8(*c*) illustrate the packet delay results incurred for the example tests of measuring the round trip times according to the test configuration of FIG. 8(*a*) with a delay option (FIG. 8(*b*)) and no-delay option (FIG. 8(*c*)).

FIGS. 9(*b*) and 9(*c*) illustrate the packet delay results incurred for the example tests of measuring the round trip times according to the test configuration of FIG. 9(*a*) with a delay option (FIG. 9(*b*)) and no-delay option (FIG. 9(*c*)).

FIGS. 10(*b*) and 10(*c*) illustrate the packet delay results incurred for the example tests of measuring the round trip times according to the test configuration of FIG. 10(*a*) with a delay option (FIG. 10(*b*)) and no-delay option (FIG. 10(*c*)).

FIGS. 11(*b*) and 11(*c*) illustrate the packet delay results incurred for the example tests of measuring the round trip times according to the test configuration of FIG. 11(*a*) with a delay option (FIG. 11(*b*)) and no-delay option (FIG. 11(*c*)).

DETAILED DESCRIPTION OF THE PREFERRED EMBODIMENT

Figure 1:
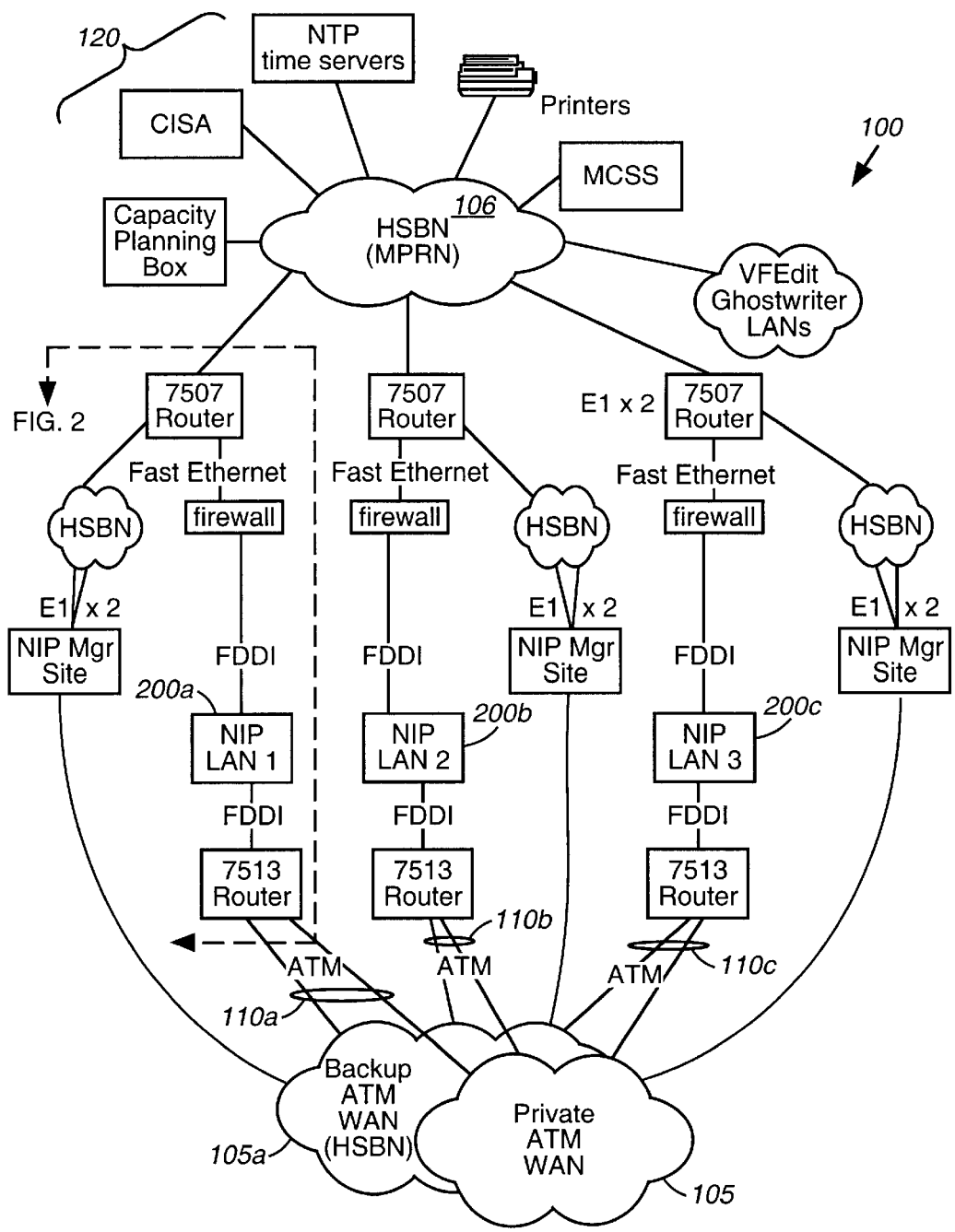
FIG. 1 illustrates the NIP LAN/WAN architecture of the invention.

FIG. 1 illustrates the Network Intelligent Peripheral "NIP" topology 100 as described in commonly-owned, co-pending U.S. patent application Ser. No. 09/444,099, the contents and disclosure of which is incorporated by reference as if fully set forth herein. As shown in FIG. 1, the "NIP" topology 100 includes a private ATM backbone WAN 105 and/or backup ATM WAN 105*a* comprising one or more BPX ATM switches for linking three or more distinct LAN network sites 200*a*–200*c*. The ATM WAN 105/back-up ATM WAN 105*a* implements private point-to-point ATM links depicted in FIG. 1 as links 110*a*–110*c* between the respective NIP LAN sites 200*a*–200*c*, respectively. The Hot Standby Backup Network (HSBN) 106 is implemented as a backup network, for connectivity to the monitoring command system (MCSS) 115, as well as other System/Network management sites 120. As will be hereinafter described in greater detail, each NIP LAN site 200*a*–200*c* comprises: a real-time call processing LAN, a provisioning LAN, and the Intelligent Peripheral LAN. As will be described, with the NIP network topology 100 depicted in FIG. 1, network latencies are minimized to meet Statement of Network Requirements (SONR) for real-time traffic, in particular that traffic which must traverse the WAN.

Figure 2:
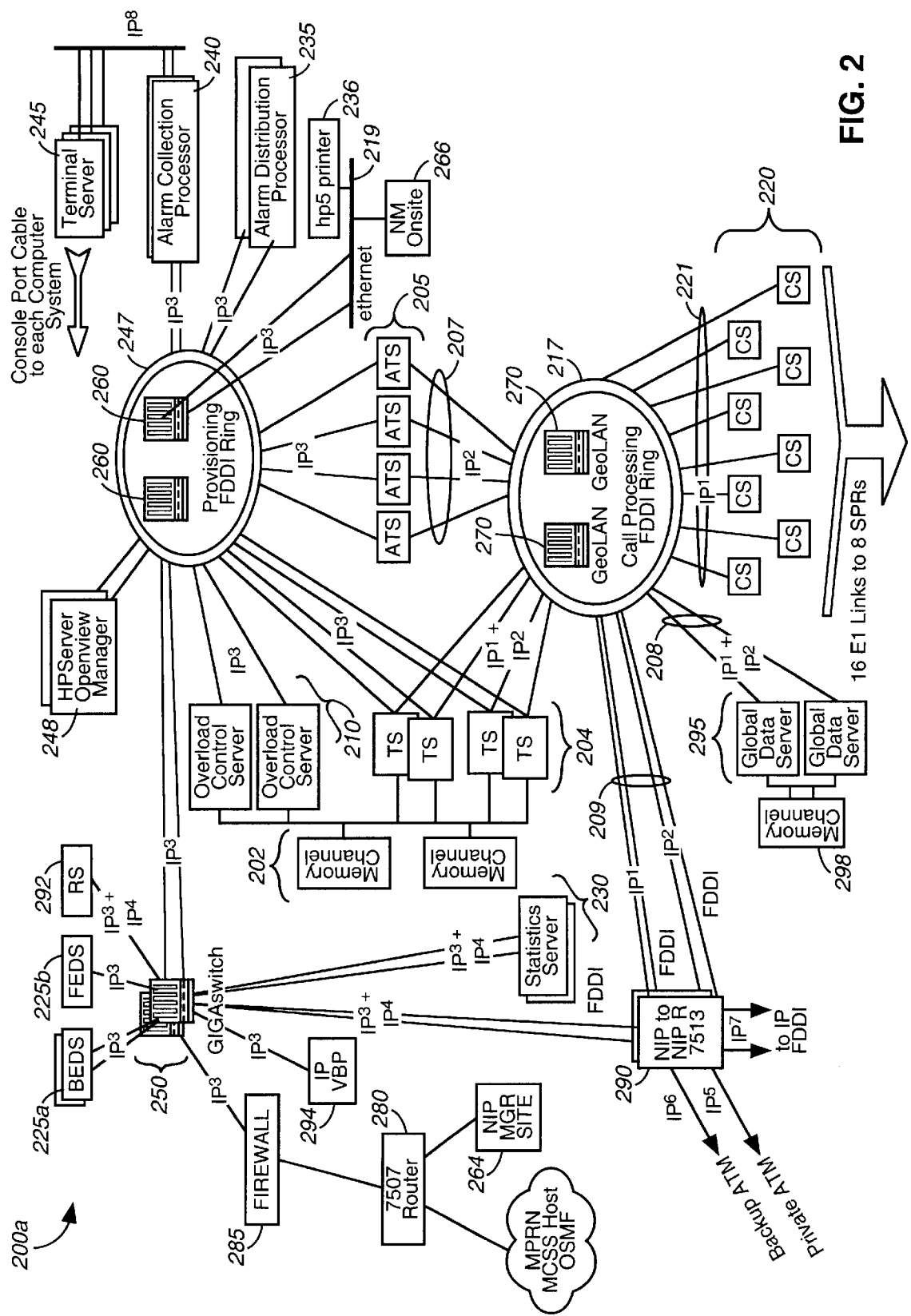
FIG. 2 illustrates the primary functional components of each of the production LANs depicted in FIG. 1.

Although the LAN configuration of the different sites may vary, FIG. 2 illustrates the general configuration of each network intelligent peripheral ("NIP") LAN site, e.g., LAN site 200*a*. As shown in FIG. 2, the LAN site 200*a* includes a real-time call processing LAN, such as implemented by a Call Processing FDDI Ring ("CPFR") 217, and a provisioning LAN, such as implemented by a Provisioning FDDI Ring ("PFR") 247. As will be explained herein in greater detail, the PFR 247 is physically split between two or more provisioning GeoLAN hubs 260 and two or more provisioning LAN GIGAswitches 250 with the GeoLAN hubs comprising traditional FDDI ring technology, while the GIGAswitches 250 are non-blocking, cross-bar switched and exploited for their higher bandwidth (as compared to the standard FDDI implementation). The FDDI ports on both the CPFR and the PFR are dual homed such that the "A" port of a given FDDI port is connected to one hub of a given ring, while the "B" port is connected to the other hub of that ring 247. This configuration ensures that the loss of any given hub does not bring down the ring. Additionally, each LAN site may include the following systems:

1) two or more communication servers 220 ("CS") for providing simultaneous communications services, e.g., transfer files, access information on systems or networks, for one or more users on the network, and which may comprise a DEC Alpha Server 4100 having a digital UNIX operating system, and, interfaced with mass storage devices (not shown) and the call processing FDDI 217;

2) two or more Memory Channel Hubs (TS/OCS) 202 which include CCMAA cards for interfacing with a bus and enabling direct memory data transfer between systems;

3) two or more transaction servers ("TS") 204 for brokering call requests for call routing information and sending the information back to the CS, and which may comprise a DEC Alpha Server 4100 having a digital UNIX operating system, and, interface with mass storage devices (not shown), the call processing FDDI 217, the provisioning FDDI ring 247, and memory channel hubs via CCMAA memory channel cards (not shown). Preferably, each TS 201 has three FDDI ports (fta0, fta1 & fta2) and each ATS 205 has two FDDI ports (fta0 and fta1). Assuming fta0 (and fta1 for the TS) is connected to the CPFR 217 and fta1 (fta2 for the TS) are connected to the PFR 247 for each server. This port split allows all real-time traffic to be prioritized by the server out to the real-time ring, while provisioning traffic is directed to the provisioning ring. Thus, different traffic types are segregated physically as well as logically, placing real-time bandwidth demands where appropriate. The multiple interfaces for the TS 204 on the same FDDI ring are due to Digital UNIXs' inability to handle multiple subnets on the same physical interface;

4) two or more Advanced Transaction Servers ("ATS") 205 which performs as the TS, however, provides more complicated services;

5) two or more global data servers ("GDS") 295 which provide call routing information to the TS & ATS and, which may additionally provide call routing information across the WAN to other sites. These servers may comprise a DEC Alpha Server 4100 having a digital UNIX operating system, and, interfaced with mass storage devices (not shown), the call processing FDDI 217, and an associated memory channel hub 298 via CCMAA memory channel cards (not shown);

6) two or more Overload Control Servers 210 which provide a busy signal for calls as the application approaches overload of it's call capacity. These servers may comprise a DEC Alpha Server 4100 having a digital UNIX operating system, and, interface with mass storage devices (not shown), the call provisioning FDDI ring 247, and memory channel via CCMAA memory channel cards (not shown);

7) two or more Back End Data Servers ("BEDS") 225a for back ups and provisioning data, and two or more Front End Data Servers ("FEDS") 225b for back ups and provisioning data. Each of these systems may comprise a DEC Alpha Server 4100 having a digital UNIX operating system, interface with mass storage devices (not shown), and interface with the provisioning LAN Gigaswitches 250;

8) two or more Statistics Servers ("SS") 230 which gather call statistics from the TS & ATS servers and which may comprise a DEC Alpha Server 4100 having a digital UNIX operating system, interface with mass storage devices (not shown), and interface with the provisioning LAN Gigaswitches 250;

9) two or more Alarm Collection Processors ("ACP") 240 which gather the application alarms from throughout the application space and which may comprise a DEC Alpha Server 1200 having a digital UNIX operating system, interface with mass storage devices (not shown), and interface with the provisioning FDDI ring;

10) two or more Alarm Distribution Processors ("ADP") 235 which take the gathered alarms and displays them to various operational personnel and, which may comprise a DEC Alpha 4100 Server having a digital UNIX operating system, interface with mass storage devices (not shown), and interface with the provisioning FDDI ring;

11) two or more Terminal Servers 245 which provide a plurality of ports available for system console port connectivity and may comprise a DECServer 700;

12) an NIP Manager 264 which may comprise a DEC Alpha 4120 Server having a digital UNIX operating system, and provided with systems for interfacing with mass storage devices (not shown);

13) an NIP Manager Onsite 266 which may comprise a DEC Personal workstation having a digital UNIX operating system, and associated displays and systems for interfacing with mass storage devices (not shown) and the ethernet LAN 219;.

13) two or more Openview Servers 248 such as provided by Hewlett Packard (HP) which provide network management system functionality;

14) two or more sets of GeoLAN Hubs 270 which provide for the configuration and monitoring of the GeoLAN Call Processing FDDI hubs 217;

15) one or more routers 280 such as router models 7507 manufactured by Cisco Systems, Inc. for routing control calls to the HSBN MPRN (MCSS Host) from the LAN site, e.g., site 200a;

16) a firewall 285 providing secure interface between the router 280 and the GIGAswitch 250 of the LAN site;

17) two routers 290 such as router models 7513 Routers manufactured by Cisco Systems, Inc. which provide an interface to the private ATM backbone WAN 105 and/or backup ATM WAN 105a. Preferably, permanent virtual circuits (PVCs) are provisioned from the router 285 to BPX switches (not shown) in the ATM backbone which use the full 155 Mbps bandwidth of the BPX switch. However, no traffic shaping is done in the router—rather, the BPX switches shape the traffic over the PVCs as will be hereinafter described in greater detail. The Cisco 7513 routers' FDDI interfaces utilize the Hot Standby Routing Protocol (HSRP) available from Cisco System Inc. and described in a product bulletin available from Cisco Systems, the contents and disclosure of which is hereby incorporated by reference, to provide for failover to the standby router in case of a LAN port failure, either on the router or on a hub.

This protocol goes into effect when the LAN connection is lost, and fails the mission traffic flow over to the standby router. Use of HSRP is necessitated by the slow recover times of RIP or Interior Gateway Routing Protocol (IGRP), relative to NIP mission requirements. Moreover, the Cisco 7513 routers utilize the Enhanced Interior Gateway Routing Protocol (EIGRP) on the ATM OC-3 interfaces to the BPX switches to provide for failover routing in the event of interface or link loss to the switches. The failure of one inter BPX link out of the two causes the switch to route all traffic over the remaining link, using the minimum specified bit rates for each PVC. Loss of all inter BPX links on one site to site path switch forces EIGRP protocol to route data via the other switch at the site. Referring back to FIG. 1, if all site to site pathways for all switches at a site are lost, the traffic is routed over the HSBN WAN depicted as WAN cloud 106. This option requires the total isolation of the site's private WAN links, i.e., the severing of three E-3 links. Preferably, Available Bit Rate (ABR) guarantees that the real-time ATS-GDS link is the first recovered, i.e., the ATS-GDS link is apportioned whatever bandwidth there is, so in the context of a recovering set of links on a switch, this link comes back first. Note this only applies to ATS-GDS links to be established across the WAN between sites, not the Call Processing LAN 217 at a site.

Other types of equipment that may be included at a LAN site include a network printer 236 connected with Ethernet LAN 219; a report server ("RS") 292 for gathering statistical data from statistics servers on call services information; and, an IP voice provisioning box (VPB) 294.

A detailed description of the operation of the NIP network is found in aforementioned co-pending U.S. patent application Ser. No. 09/444,099. As described, the suite of servers in each given ring (CPFR 217 & PFR 247) are each dual homed; further, half of the servers of a given contingent (e.g., the CS's) are connected to one card in the given hub, while the other half is connected to another card in the hub. Thus, network architecture is enabled to maintain a mission capability, albeit degraded, in case a given card in the two hubs has failed. To support this configuration, the architecture employs a Spanning Tree Protocol (STP) (proprietary to Cisco Systems, Inc.) which must be turned off to prevent failover times in excess of 45 seconds. With STP off, failover times are less than three seconds. Additionally, with STP off, the LAN topology must avoid loops involving the GIGAswitches, lest a network loop be created.

Messages destined for the CPFR 217 are typically real-time, high-priority data flows dealing with call processing, with minimal management traffic. As further shown in the NIP LAN site 200a of FIG. 2, these call processing messages flow via lines 221 into the CPFR 217 particularly from a CS 220 from the Call Transmission Network ("CTN") network. Additional traffic into the CPFR include messages from a remote ATS 205 over lines 207, destined for the GDS 295. Other types of traffic may be routed from the Cisco 7513 router 290 into the CPFR 217 via line 209. Outgoing message flows from the CPFR 217 are primarily from the CS to the CTN network, and, from the ATS to a remote GDS via lines 208.

Example message flows to be routed within the CPFR 217 include, but are not limited to, the following: messages from the CS 220 to the TS 204 (and reverse) and messages routed from the TS 204 to an ATS 205 via the CPFR 217; messages from the CS 220 to the TS 204 via the CPFR 217 and routed from the TS 204 to an 800 call processing server 216 via the CPFR 217 (and reverse); messages (multicast) between a transaction/advanced transaction server 204/205 and the SS 230 via the PFR 247 and the GIGAswitch 250; messages between a CS 220 and a local GDS 295 at the same site by way of the TS 204, the ATS 205, and the CPFR 217 (and reverse); messages between a CS 220 and a GDS 295 at a remote site by way of the TS 204, the ATS 205, the CPFR 217 to the router 290 and from the router via an OC3 connection to a first ATM BPX switch 275a associated with NIP LAN site, e.g., site 200a, and through a PVC pipe (represented by ATM cloud 105) to a second ATM BPX switch 275b associated with remote NIP LAN site, e.g., site 200b, to a router 290 at the remote site via an OC3 connection and finally to the remote GDS 295 through CPFR 217 at the remote site; and, messages between a SS 220 and a RS 292 at a remote site by way of the GIGAswitch 250 to the router 290 and from the router via an OC3 connection to a first ATM BPX switch 275a associated with NIP LAN site, e.g., site 200a, and through a PVC pipe (represented by ATM cloud 105) to a second ATM BPX switch 275b associated with remote NIP LAN site, e.g., site 200b, to a router 290 at the remote site via an OC3 connection and finally to the remote RS 292 via the GIGAswitch 250 at the remote site. As will be appreciated by skilled artisans, messages are contained within the FDDI ring 217 via the token matching mechanism with each station on the ring receiving the passed token with each message. If the token does not match that station's token, the token/message is passed on to the next station. Once the token matches the station token address, the IP address of the message is matched to an IP port address. Messages meant to leave the ring are sent to the gateway, which is the Rules Based Router (RBR), i.e., a server acting as a router.

As further shown in FIG. 2, messages destined for the PFR 247 are typically provisioning and support data flows. The PFR 247 consists of the FDDI hubs and the GIGAswitches 250a,b, which together form the logical FDDI ring. That is, the GIGAswitches are a logical extension of the FDDI ring and provide for the configuration and monitoring of the GeoLAN FDDI hubs. As deduced from FIG. 2, example message flows involving the PFR 247 may include: TS 204 to SS 230 (PFR) multicast; ATS 205 to SS (PFR) multicast; from varied systems to an ADP 235 (PFR and GIGAswitch); from varied systems to the ACP 240 (PFR and GIGAswitch); HP Openview Manager server 248 (PFR and GIGAswitch) from network devices; NM On-site 266 from ADP 235 and BEDS-FEDS (local is GIGAswitch only); IP VPB (local is GIGAswitch only) which is a separate box for the Intelligent Peripheral; SS 230 to RS 292 (local is GIGAswitch only); BEDS to TS/ATS (PFR and GIGAswitch); MCSS to FEDS; FEDS to FEDS; and, the ADP 235 to a Network Manager Remote (NMR).

As the majority of the traffic from outside of the PFR 247 is expected on the cross WAN, SS to RS data transfer, e.g., which is approximately 7 Mb every minute, with a less than 4 second delivery window, the NIP architecture is sized for three such transactions simultaneously. The same applies to message flow out of the PFR. With respect to provisioning and support data message flows within the PFR ring 247, these messages typically include, but are not limited to: flows between the TS and SS (PFR); ATS to SS (PFR); from varied systems to the ADP (via PFR and GIGAswitch); from varied systems to ACP (via PFR and GIGAswitch); HP Openview server (via PFR and GIGAswitch); NM On-site; BEDS-FEDS (local is GIGAswitch only); IP VPB (local is GIGAswitch only); SS to RS (local is GIGAswitch only); and BEDS to TS/ATS (via PFR and GIGAswitch).

As mentioned above, the PFR 247 is physically split between GeoLAN hubs 260a and GIGAwitches 250. This split of the PFR into GeoLAN hubs 260a and GIGAswitches 250 allows the ring to carry more traffic than a traditional FDDI ring. The GIGAswitches add more FDDI ports to the ring, without additional ring latency increases. Adding new subnets or LAN segments off of the GIGAswitches do not necessarily require the routers.

Furthermore, as described in aforementioned co-pending U.S. patent application Ser. No. 09/444,099, the NIP is logically configured to meet Real-Time call processing traffic (e.g., CS-TS), ATS-GDS traffic, and provisioning traffic requirements. Real-Time call processing traffic, ATS-GDS traffic, and provisioning traffic each have differing latency requirements. In order to meet these differing requirements, subnets are employed to separate the traffic types within the LAN and WAN, as desired. Each subnet enables the assignment of specific traffic types to specific interfaces on network devices. These interfaces are to be optimised in various ways (e.g., using NetFlow). Additionally, segregated traffic may be directed to specific PVCs in the ATM WAN cloud 105 (FIG. 1), with each PVC further configured using priority rate queuing in the BPX. These optimising configurations enables the tuning of the NIP LAN/WAN to deliver specific traffic types in the most mission efficient manner.

For example, the mission traffic profiles include the following, but are not limited to: real-time call processing (e.g., CS-TS traffic), ATS-GDS traffic, provisioning traffic, and even a dedicated subnet for SS-RS traffic. The creation of the PVCs for the WAN also necessitates the allocation of another subnet. As shown in FIG. 2, each subnet (indicated by the number in the left column) is allocated a mission, detailed below.

TABLE 1

Subnet Missions

| IP No. | Subnet Mission |
|---|---|
| 1 | Real-Time Call Processing Traffic |
| 2 | ATS-GDS Real-Time Call Processing Traffic |
| 3 | Provisioning Traffic (this will consist of three separate entire class C addresses, and is not an actual subnet of the three previously defined class C addresses) |
| 4 | SS-RS Traffic |
| 5 | WAN Primary Link PVCs (out of the XX.YYY.ZZ.0 address space) |
| 6 | WAN Secondary Link PVC (out of the XX.YYY.ZZ + 1.0 address space) |
| 7 | Allocated as a separate set of Class C addresses for the IP |
| 8 | Allocated for IP Ethernet Management Rail |

The PVCs for the ATM WAN likewise fall in the following categories: real-time call processing (ATS-GDS), provisioning traffic and SS-RS data transfers. Traffic which does not explicitly fall into a given category defaults to the provisioning PVC. The priority rate queuing figures for the real-time and provisioning traffic may be derived in accordance with conventional techniques known to skilled artisans. For example, the SS-RS traffic may be given the full bandwidth of an E-3 link (34 Mbps link) to facilitate the data transfer and meet the application's timing requirements.

Figure 3:
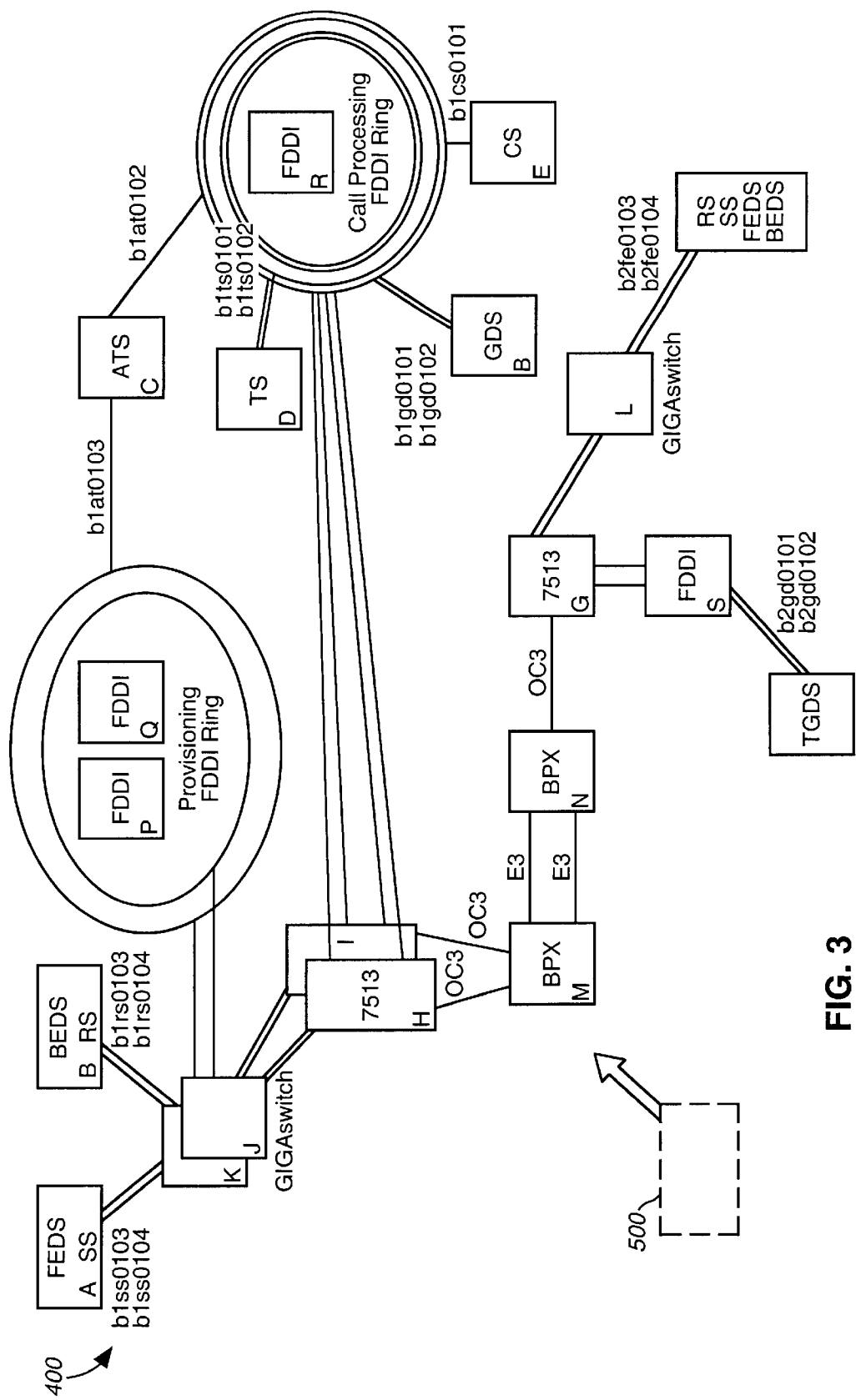
FIG. 3 illustrates the benchmark topology 400 for testing the NIP LAN/WAN production site (of FIG. 2) according to the invention.

The benchmark topology 400 for testing the NIP LAN/WAN production site (of FIG. 2) according to one embodiment of the invention is now described herein in view of FIG. 3. The high-level configuration depicted in FIG. 3 is exemplary as it is configured to provide only the correct numbers and types of interfaces and network paths so that the required tests may be completed. It is understood that a benchmark test set-up may be provided which may completely duplicate a production site (e.g., of FIG. 2). As shown in FIG. 3, for testing purposes, each of the following systems corresponding to a server device implemented in the NIP LAN/WAN architecture network, and may be physically implemented, for example, by a DEC Alpha series server device. These blocks include: system A (FEDS); system B (GDS); system C (ATS); system D (TS); system E (CS); system F (RS, SS); and system T (Remote GDS). Systems G, H and I includes a Cisco 7513 Router; while systems K, J and L are the GIGASwitches. Systems P and Q are the call provisioning FDDI ring GeoLan Hubs while systems R and S are the call processing FDDI ring GeoLan Hub. Systems M and N are the BPX traffic shaping switches.

According to a preferred embodiment, as shown in FIG. 3, the benchmark test system of the invention implements a test tool 500, herein referred to as a Network Path Test Tool ("NPT") which, in its most simple mode, sends packets to a targeted remote system, and receives returned packets. The NPT tool 500 logs the returning packets, and compares timestamps to determine the length of the round trip. Preferably, the tool runs in user mode, and assembles packets that are then passed onto an IP socket interface. The NPT tool may send either TCP or UDP packets, and supports the TCP_NODELAY socket option. An optional file specification may cause the contents of the file to be passed along as payload data within each packet.

As will be further described herein, for more complex testing, the NPT tool runs test suites including scripts which may send the packet through a sequence of systems and back, allowing for the computation of round trip delays for the network along an application communication path. Furthermore, an additional script may be added to the test suite that performs a traceroute to every interface address and hostname. The purpose of this demonstrates that the host files and routers are correctly set up, and that packets between specific systems followed the correct paths. Packets are only transmitted via an interface's primary address, the secondary address is used only for receiving packets. This means that, for instance, real-time subnet 2 traffic e.g., from the ATS, may be sent via the subnet 3 provisioning interface. Analysis of the output of this script from each system is used to validate the router configurations.

Figure 4:
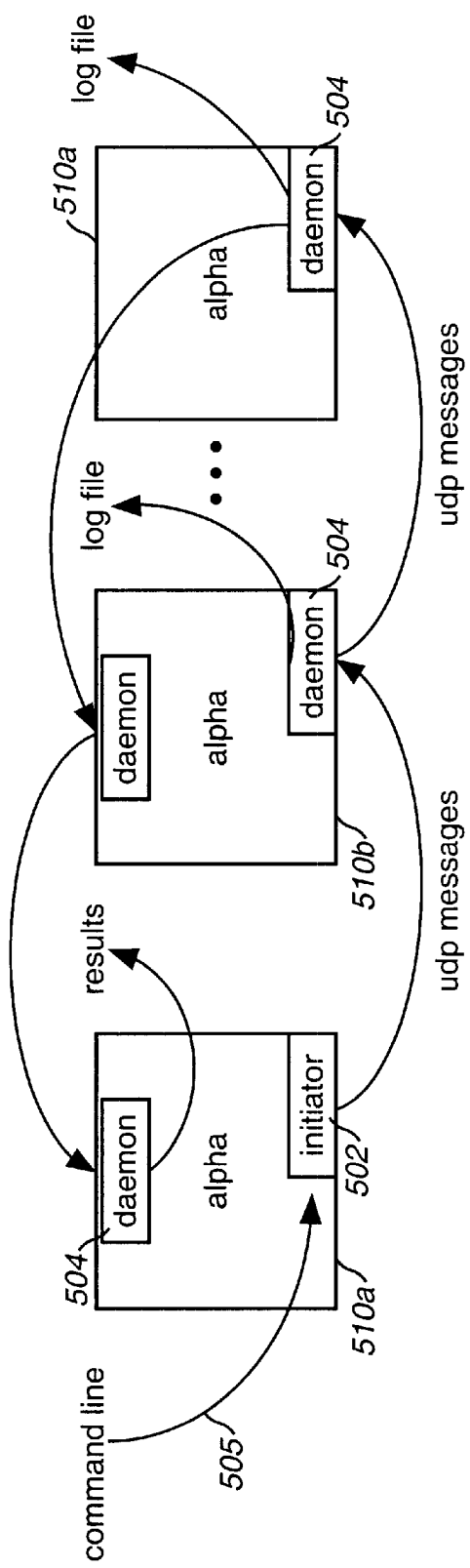
FIG. 4 illustrates the NPT tool 500 comprising one or more processes running on one or more host servers, e.g., DEC alpha, and including NPT tool initiator and daemon processes.

More specifically, as shown in FIG. 4, the NPT tool 500 comprises one or more processes running on one or more host servers, e.g., DEC alpha, and includes an NPT tool initiator process 502 and daemon processes 504. Specifically, the Network Path Test Tool Initiator 502 provides a command line interface 505 that enables a user to specify a series of hosts through which a data buffer will be sent. The characteristics of the data buffer may be specified as well as the sending behavior and the protocol used. The buffers are timestamped and marked with a unique sequence number before leaving the initiator. This starting timestamp is later used to calculate transmit times through the specified series of host servers 510a, . . . ,510n, and back to the initiator host. The IP Network Path Test Tool Initiator 502 works in conjunction with an IP Network Path Test Tool Daemon 504 that moves the buffer from host server to host server, according to the desired test path, and to report the elapsed time at the final host as illustrated in FIG. 4.

According to the invention, required command line inputs for the IP Network Path Test Tool Initiator include at least one hostname and one port number. Up to 40 hostnames may be specified. Each hostname must have a corresponding port number. Thus, for test scripts utilized by the NPT tool, the following are the required command line arguments utilized:

-h which is an argument used for indicating the valid hostname or IP address entered as, e.g, 123.456.78.90 or, e.g., mciwcom.host.com; and, -p which is an argument used for indicating the valid port number on the corresponding host.

Optional command line arguments for the IP Network Path Test Tool Initiator include:

-f which is an argument used for indicating the full path and filename of a file containing additional data to be sent. The default is no additional data;

-n which is an argument used for indicating the number of messages to be sent. The default is 0, to continue to send forever;

-i which is an argument used for indicating the interval between messages in microseconds. The default is 0 sec., to send continuously; and, -r which is an argument for specifying the protocol type (e.g. 0=UDP 1=TCP, default=1).

The command line inputs are then validated and a message buffer to send to the host is built based on the arguments. Preferably, the message buffer is built as follows: 4 byte remaining size (which is the total size of the message buffer -4); 4 byte sequence number; four (4) byte number of hosts; the number of hosts*(16 bytes containing the host address, port, and timestamp); the host address; the host port; the timestamp; and, the records from the payload file (if there are any). For the TCP protocol, a connection oriented streams based socket is created to pass the data buffer to the upstream host servers which connection is to the Network Path Test Tool Daemon process 504. For the UDP protocol, a connectionless datagram socket is created to the host. It is understood that all of the NPT initiator and daemon processes must be started running the same protocol, either TCP or UDP. Finally, the data buffer that is generated by the initiator is sent at specific intervals for as many repetitions as specified by the command line arguments. Each time a new buffer is sent, a new sequence number and timestamp is calculated.

The IP Network Path Test Tool Daemon process 504 works in conjunction with the IP Network Path Test Tool Initiator by providing a mechanism to receive buffers from the downstream processes, timestamp the buffers, and send the buffers to upstream processes. If this particular process is the last in the specified series of processes, this process will calculate and display the elapsed roundtrip time of the buffer in microseconds.

For test scripts utilized by the NPT Tool Daemon, the following is the required command line argument:

-p an argument indicating a valid port number.

Optional command line arguments for the IP Network Path Test Tool Daemon include:

-r an argument indicating the protocol type (e.g., 0=UDP, 1=TCP, default=1);

-d an argument indicating presence of an optional debug file for storing sequence numbers and timestamps of buffers passing through the process; and, -z an argument indicating a fork off a daemon process. The default is the process is not a daemon.

The command line inputs are then validated and a socket is created. The type of socket created depends on what protocol is being used. For TCP a connection oriented streams based socket is created which listens for incoming connection requests, and accepts connection requests. For UDP a connectionless datagram socket is created.

Once the socket to the downstream process has been created, the data buffer received from the downstream process is processed and sent to the next process in the chain (if there is one). If this is the last process in the chain, then this process calculates and displays the elapsed roundtrip time of the data buffer, for example, in microseconds. It should be understood that the all processes must be started running the same protocol (TCP or UDP) and the final Network Path Test Tool Daemon process which calculates the elapsed time must reside on the same host as the Network Path Test Tool Initiator process or else the resulting elapsed timestamp will not make any sense due to possible clock differences on the various hosts. Furthermore, if the Network Path Test Tool Daemon process is run as a daemon process (i.e., daemon flag set on), error messages will not be displayed to standard terminal output because daemon processes are not attached to a terminal process.

An example command line illustrating a traversal from host 0 to host 1 to host 2 back to host 1 to host 0 in accordance with scripts found in Appendix B is as follows:
npt-h<$1^{st}$ host>-p2001-h<$2^{nd}$ host>-p2001-h<$1^{st}$ host>-p2002-h<0th host>-p2002

In accordance with the benchmarks established for the NIP LAN/WAN design of FIG. 2, and executed by the NPT tool 500 configured for test in accordance with the benchmark topology of FIG. 3, the test methodology of the invention comprises at least the following functional test groups, including but not limited to: 1) Path Validation & Latency Measurements including tests for verifying that messages are going by the intended paths and for measuring round trip latencies. As an example, such test may be used to establish whether there are some hidden paths that could make the GIGAswitches disable links. Test for LAN latency are also included which will ultimately be affected by the number of stations on the FDDI rings; 2) Dual NIC Impact for testing the impact of dual FDDI NIC cards in an ATS system; 3) Failover/Failback to evaluate timings for LAN/WAN component failure modes and LAN/WAN component failback; and, 4) High Load Multiple Data Set Network Impact test for verifying real-time, provisioning and SS-RS data across the WAN.

Path Validation & Latency Measurements

Figure 5A:
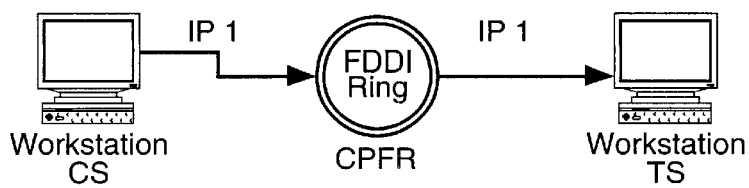
FIG. 5(*a*) depicts an example logical test configuration between a communications server and a transaction over a call processing FDDI ring according to the invention.
Figure 6A:
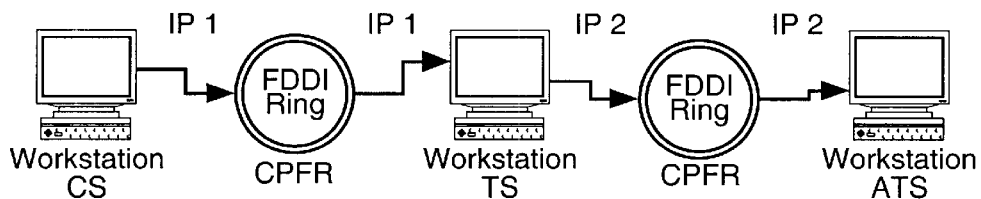
FIG. 6(*a*) illustrates the logical test configuration for verifying successful packet transfer from a communications server to an advanced transaction server according to the invention.
Figure 7A:
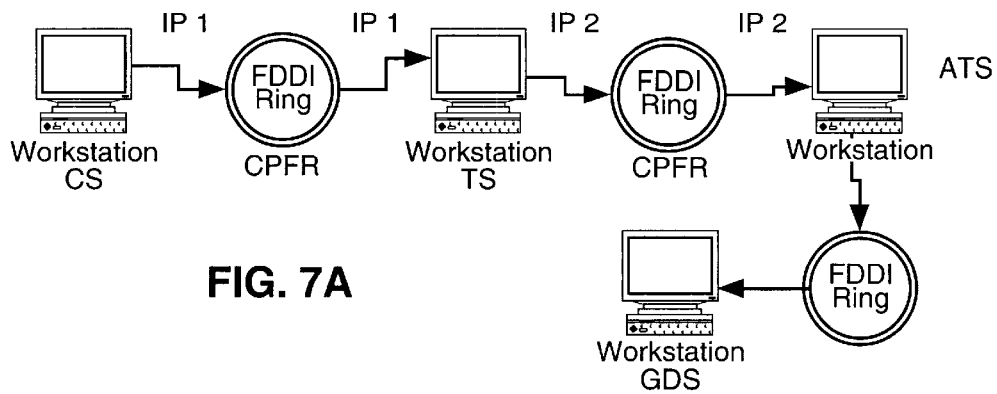
FIG. 7(*a*) illustrates the logical test configuration for verifying successful packet transfer from a communications server (CS) to a global data server (GDS) according to the invention.
Figure 8A:
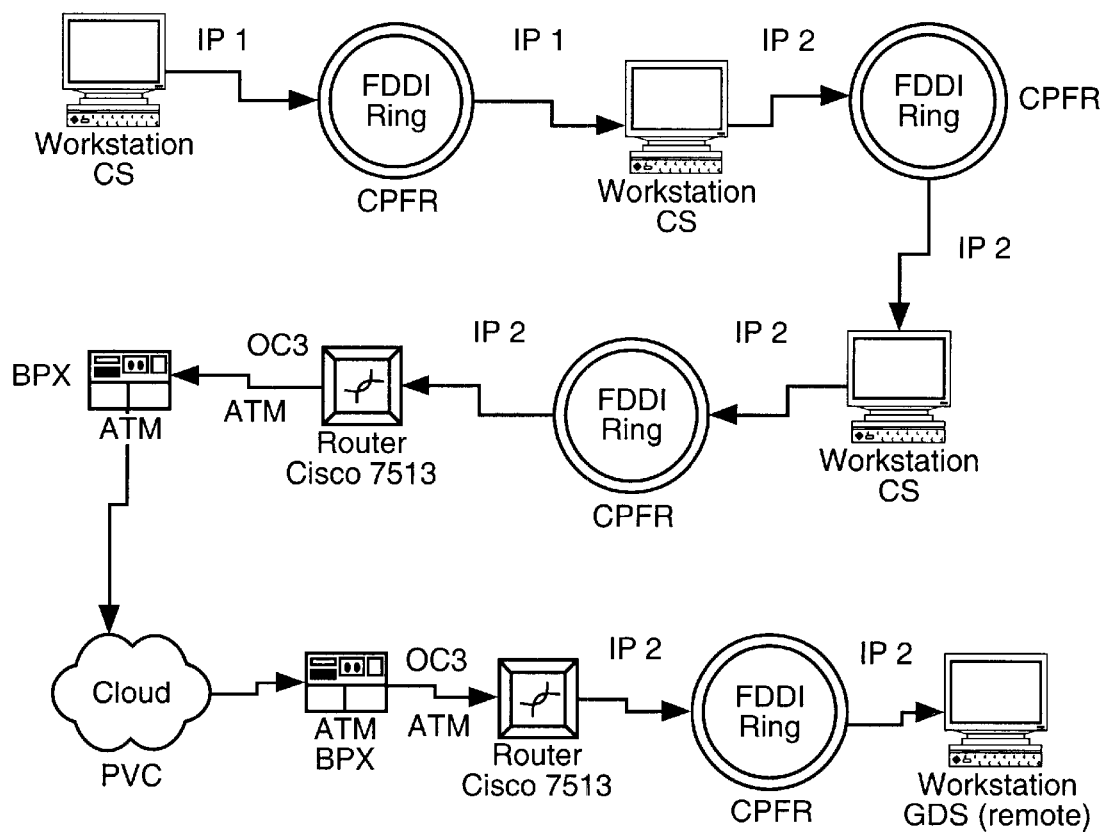
FIG. 8(*a*) illustrates the logical test configuration for verifying successful real-time call processing packet transfer from a CS to a remote GDS over a WAN according to the invention.
Figure 9A:
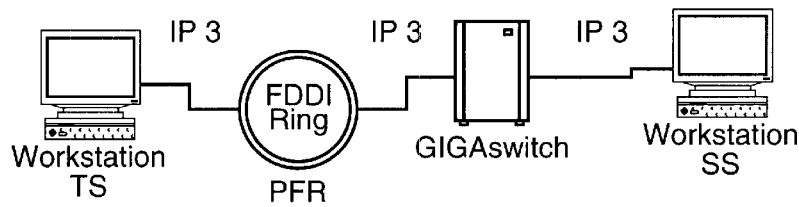
FIG. 9(*a*) illustrates the logical test configuration for verifying successful provisioning packet transfer from a transaction server to a statistics over a provisioning FDDI ring according to the invention.

As mentioned above, a critical benchmark test includes the Path Validation & Latency Measurements test. According to the invention, the following tests are configured to ensure that traffic uses the intended network paths: a) CS-CPFR-TS which verifies basic Communications Server (CS) to Transaction Server (TS) connectivity path through the Call Processing FDDI Ring (CPFR) such as illustrated in FIG. 5(a). As the underlying technology is reliable and mature, this test is for latency data; b) a CS-CPFR-TS-CPFR-ATS test which verifies performance of the connectivity path from CS to TS over subnet 1, and then from TS to the ATS via subnet 2, such as illustrated in FIG. 6(a); c) a CS-CPFR-TS-CPFR-ATS-CPFR-GDS (local) test which verifies performance of the communications path from the CS to the local GDS, such as shown in FIG. 7(a); d) a CS-CPFR-TS-CPFR-ATS-CPFR-Cisco 7513 FDDI-Cisco 7513 ATM-BPX-BPX-Cisco 7513 ATM-Cisco 7513 FDDI-CPFR-GDS (remote) test which verifies performance of the worst case real time connectivity path to a remote GDS such as shown in FIG. 8(a); e) a TS-PFR-GIGAswitch-SS test which verifies performance of the connectivity path from the TS to the SS via the PFR and GIGAswitch such as shown in FIG. 9(a), and which configuration may be considered identical to that using an ATS from a network point of view; f) a FEDS-GIGAswitch-Cisco 7513-BPX-BPX-Cisco 7513-

Figure 10A:
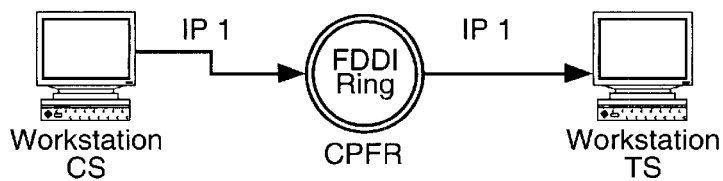
FIG. 10(*a*) illustrates the logical test configuration for verifying successful packet transfer from a front end data server to a back end data server over the a PVC on a WAN according to the invention.
Figure 11A:
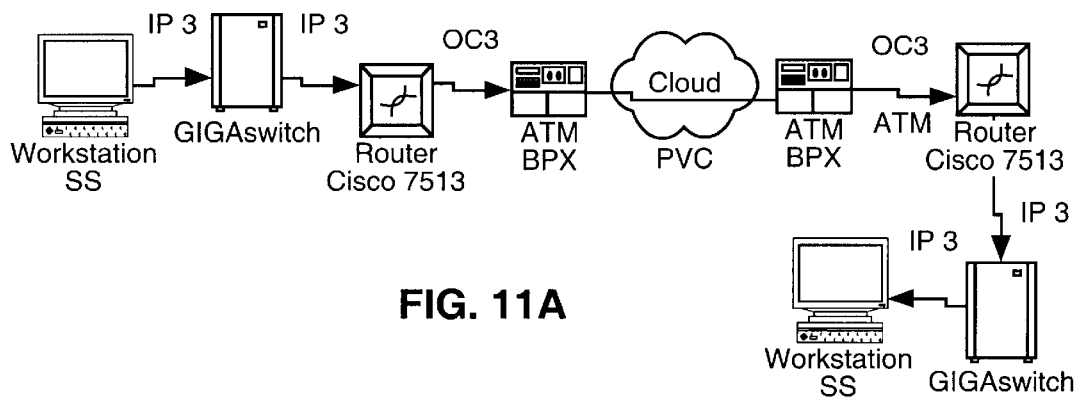
FIG. 11(*a*) illustrates the logical test configuration for verifying successful packet transfer from a statistics server to a report server (RS) over the WAN according to the invention.

GIGAswitch -BEDS test which verifies performance of the connectivity path from the FEDS across WAN path to the distant FEDS, such as illustrated in FIG. 10(a); g) a SS-GIGAswitch-Cisco 7513-BPX-BPX-Cisco 7513-GIGAswitch-RS test which verifies performance of the connectivity path from the SS to RS path across the WAN such as shown in FIG. 11(a); h) a LAN High Load R/T test for verifying the impact of flooding the Call Processing LAN with real-time traffic; i) a LAN High Load Provisioning test for verifying the impact of flooding the Provisioning LAN with provisioning traffic; j) a WAN High Load R/T test for verifying the impact of flooding the WAN with real-time traffic; k) a WAN High Load Provisioning test for verifying the impact of flooding the WAN with real-time traffic; and, l) a WAN High Load SS-RS test for verifying the impact of flooding the WAN with SS-RS traffic.

Preparation for each test includes the following procedures: For each server, e.g., DEC Alpha, used in the test, the following test directories are created: /test, /test/data, /test/store, /test/scripts and /test/bin. The NPT daemon and initiator executables are then placed on each server in the /test/bin directory, and the test scripts are placed on each server in the /test/scripts directory. For UNIX server devices, the default UNIX path is set to include /test/bin and /test/scripts. Each server is configured with the IP addresses for each site as shown in Appendix A with verification of all each network device configuration.

Figure 5B:
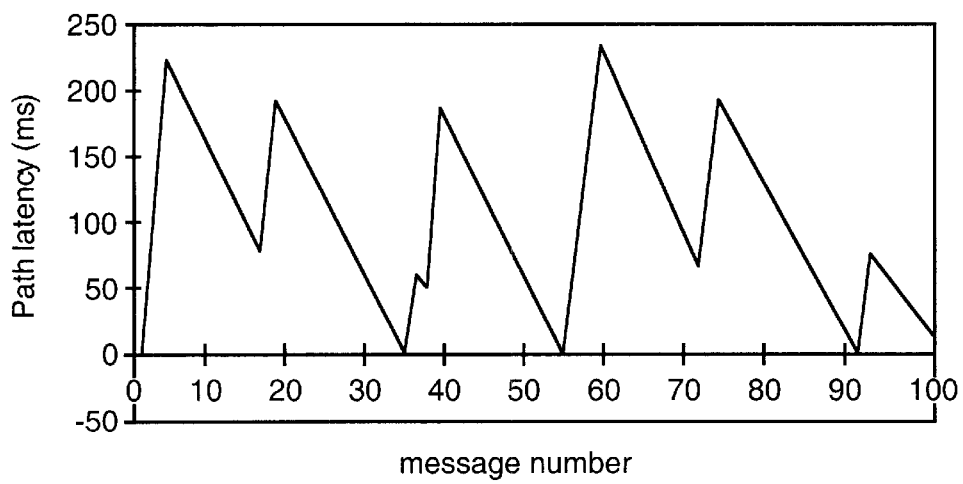
Figure 5C:
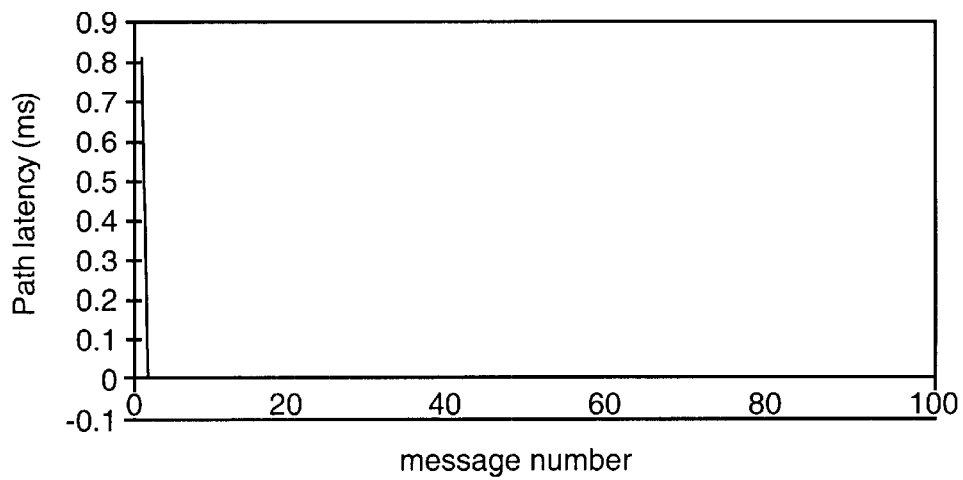

Each of the above mentioned tests will now be described tests will now be described in further detail. Particularly, FIG. 5(a) illustrates the logical test configuration for the CS-CPFR-TS connectivity path which verifies successful packet transfer from CS to TS over the FDDI, with no extraneous routes, via subnet 1 (IP_1) addresses. According to one embodiment of the CS-CPFR-TS benchmark test methodology of the invention, 100 messages are transmitted at 10 millisecond intervals from the CS directed to the TS, which are then directed back to the CS. After starting NPT test Daemons on systems E and D (see FIG. 3) using executable script startnpt, as provided in Appendix B, this test methodology is initiated on system E in accordance with test scripts entitled case11d (delay) and case11nd (no delay), the example scripts being provided in Appendix B. The round trip times for messages traversing this path according to these example test scripts are recorded. All tests may be performed twice, with the TCP delay on and TCP delay off. FIGS. 5(b) and 5(c) illustrate the packet delay results incurred for the example tests that measure round trip times from the CS to the TS, then back to the CS with a delay option (FIG. 5(b)) and no-delay option (FIG. 5(c)). As shown in. FIG. 5(b) there is illustrated the packet delays incurred for messages sent by not utilizing the TCP_NODELAY socket option, i.e., with delay. As shown in the CS-TS results of FIG. 5(b), cyclic pattern in the roundtrip times suggests a buffer related mechanism may be at work. As shown in FIG. 5(c), the roundtrip times recorded are in the sub-millisecond range which indicates normal expected LAN performance for this type of traffic.

Figure 6B:
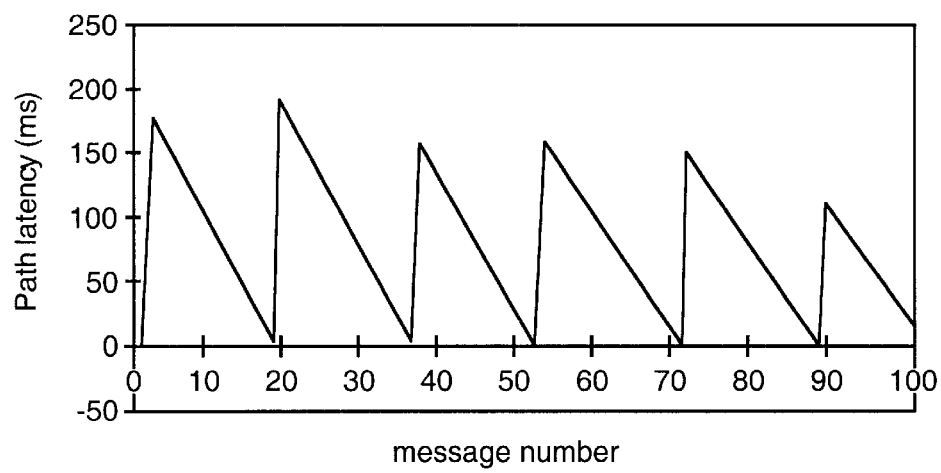
Figure 6C:
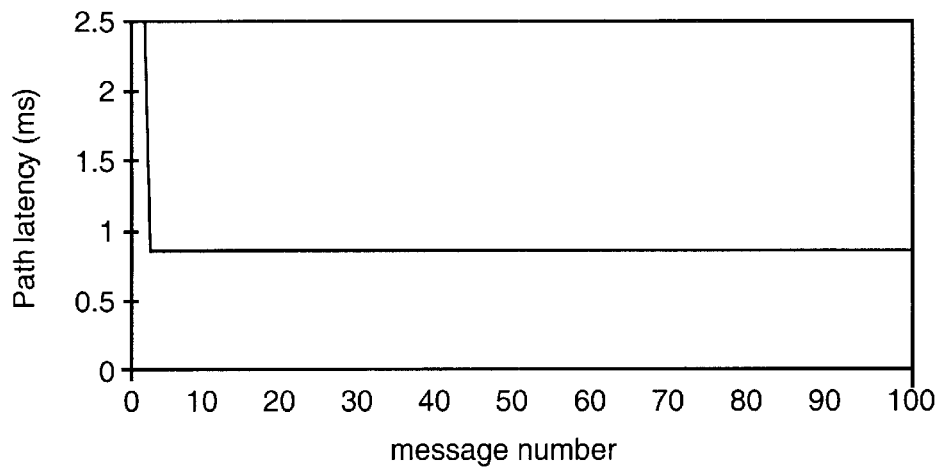

FIG. 6(a) illustrates the logical test configuration for the CS-CPFR-TS-CPFR-ATS connectivity path which verifies successful packet transfer from the CS to ATS with no extraneous routes and, the successful transition of the packets from subnet 1 to subnet 2. According to one embodiment of the CS-CPFR-TS-CPFR-ATS benchmark test methodology of the invention, 100 messages are transmitted at 10 millisecond intervals from the CS to the TS (via the CPFR) which redirects the message packets to ATS which finally returns packets to the CS via the traversed route. After starting NPT test Daemons on systems C, E and D (see FIG. 3) using executable script startnpt, provided in Appendix B, this test methodology is initiated on system E in accordance with executable test scripts entitled case12d (delay) and case12nd (no delay) scenarios, with example scripts being provided in Appendix B. The round trip times for messages traversing this path according to these example test scripts are recorded. FIGS. 6(b) and 6(c) illustrate the results of the example tests for measuring the round trip times from the CS to the TS to the ATS, then back to the CS with a delay option (FIG. 6(b)) and no-delay option (FIG. 6(c)). Recorded roundtrip times in the 1–2 ms range for a three-system roundtrip is well within the desirable performance requirements and is clearly met as shown in the test results for the no delay option illustrated in FIG. 6(c).

Figure 7B:
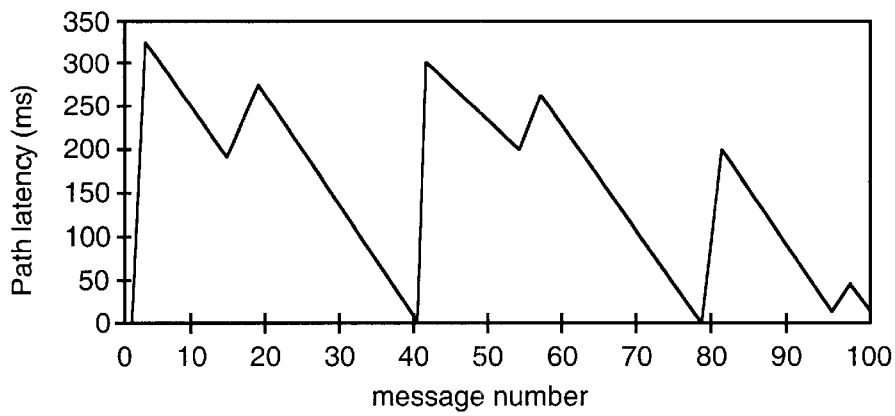
Figure 7C:
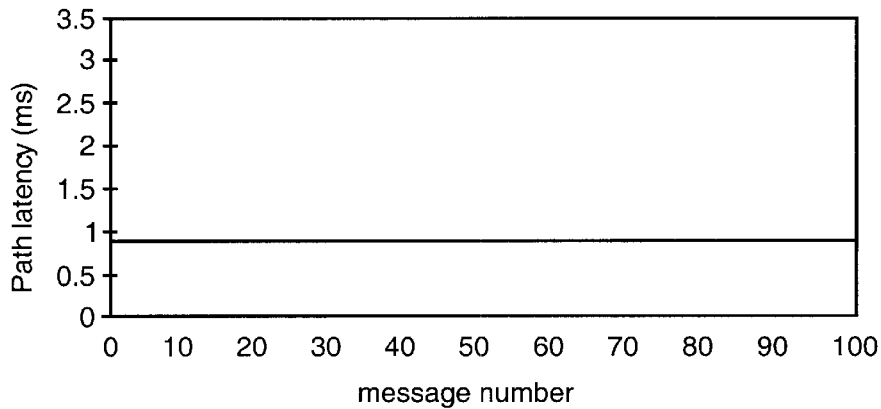

FIG. 7(a) illustrates the logical test configuration for the CS-CPFR-TS-CPFR-ATS-CPFR-GDS (local) connectivity path which verifies successful packet transfer from CS to GDS with no extraneous routes and, the successful transition of the packet from subnet 1 to subnet 2. According to one embodiment of the CS-CPFR-TS-CPFR-ATS-CPFR-GDS (local) benchmark test methodology of the invention, 100 messages are transmitted at 10 millisecond intervals from the CS directed to the TS which redirects test message packets to ATS which ATS redirects test message packets to GDS (local) which finally returns packets to the CS via traversed route. After starting NPT test Daemons on systems B, C, E and D (see FIG. 3) using executable script startnpt, provided in Appendix B, this test methodology is initiated on system E in accordance with executable test scripts entitled case13d (delay) and case13nd (no delay) scenarios, with example scripts being provided in Appendix B. The round trip times for messages traversing this path according to these example test scripts are recorded. FIGS. 7(b) and 7(c) illustrate the packet delay results incurred for the example tests of measuring the round trip times from the CS-TS-ATS-GDS (local) with a delay option (FIG. 7(b)) and without the delay option (FIG. 7(c)).

Figure 8B:
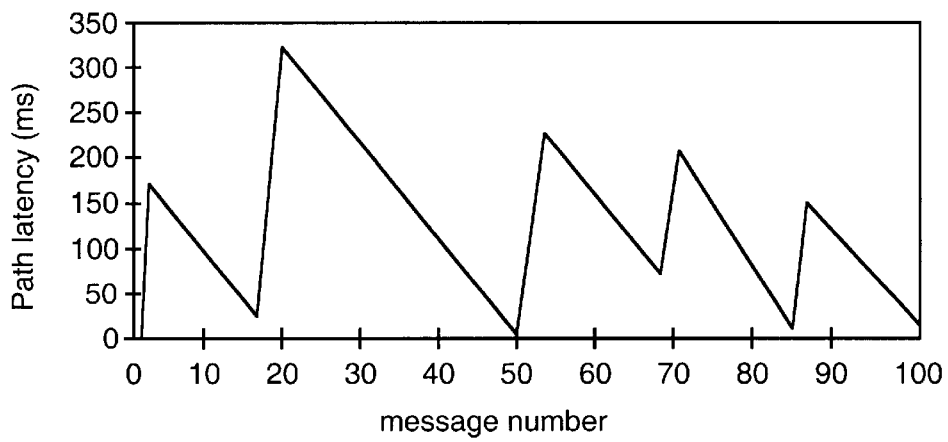
Figure 8C:
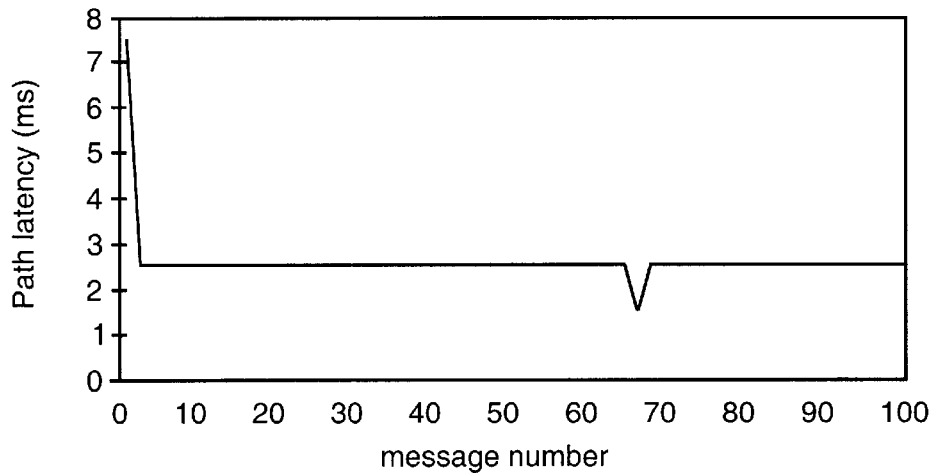

FIG. 8(a) illustrates the logical test configuration for the CS-CPFR-TS-CPFR-ATS-CPFR-Cisco 7513 FDDI-Cisco 7513 ATM-BPX-BPX-Cisco 7513 ATM-Cisco 7513 FDDI-CPFR-GDS (remote) connectivity path for verifying successful packet transfer from a CS to remote GDS over the WAN, with no extraneous routes, using subnet 2 (real-time call processing traffic). According to one embodiment of the CS-CPFR-TS-CPFR-ATS-CPFR-Cisco 7513 FDDI-Cisco 7513 ATM-BPX-BPX-Cisco 7513 ATM-Cisco 7513 FDDI-CPFR-GDS (remote) benchmark test methodology of the invention, 100 messages are transmitted at 10 millisecond intervals from the CS directed to the TS which redirects message packets to ATS which redirects the message packets to the GDS (remote) which finally returns packets to the CS via the traversed route. After starting NPT test Daemons on systems T, C, E and D (see FIG. 3) using executable script startnpt, provided in Appendix B, this test methodology is initiated on system E in accordance with executable test script entitled case14d (delay) and case14nd (no delay), with example scripts being provided in Appendix B. The round trip times for messages traversing this path according to these example test scripts are recorded. FIGS. 8(b) and 8(c) illustrate the packet delay results incurred for the example tests of measuring the round trip times from the CS-TS-ATS-GDS (remote) with a delay option (FIG. 8(b)) and without the delay option (FIG. 8(c)).

Figure 9B:
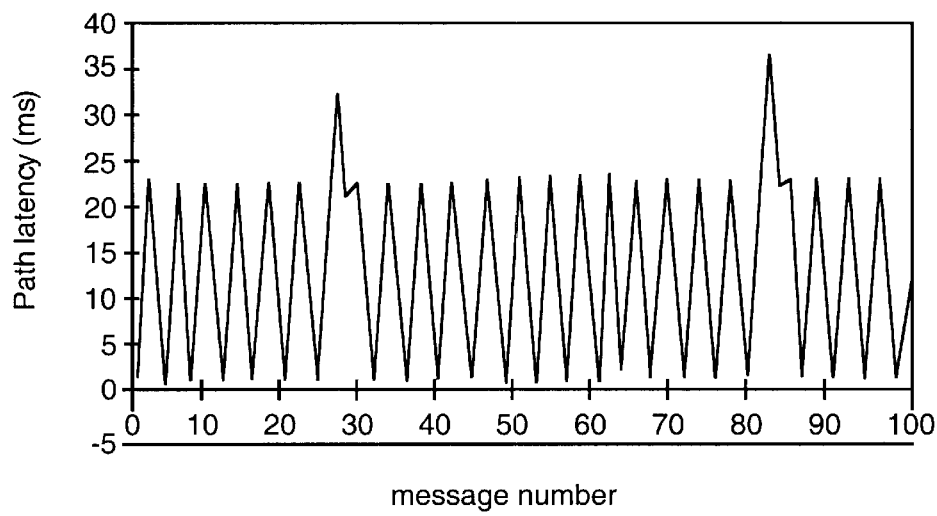
Figure 9C:
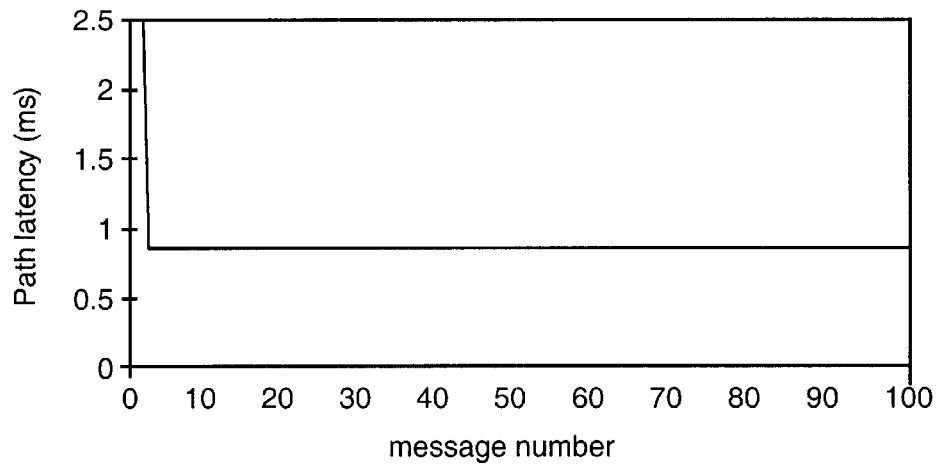

FIG. 9(a) illustrates the logical test configuration for the TS-PFR-GIGAswitch-SS connectivity path for verifying successful packet transfer from a TS to an SS with no extraneous routes via subnet 3 (Provisioning traffic). According to one embodiment of the TS-PFR-GIGAswitch-SS benchmark test methodology of the invention, 1000 messages (300 octets) are transmitted at 500 microsecond intervals from the TS directed to the SS which SS redirects the message packets back to the TS. After starting NPT test Daemons on systems C and A (see FIG. 3) using executable script startnpt, provided in Appendix B, this test methodology is initiated on system C in accordance with executable test scripts entitled case15d (delay) and case15nd (no delay), with example scripts being provided in Appendix B. The packet delay results incurred for the example tests of measuring the round trip times for messages traversing this path according to these example test scripts are recorded such as shown in FIG. 9(*b*) (with delay) and 9(*c*) (without delay).

Figure 10B:
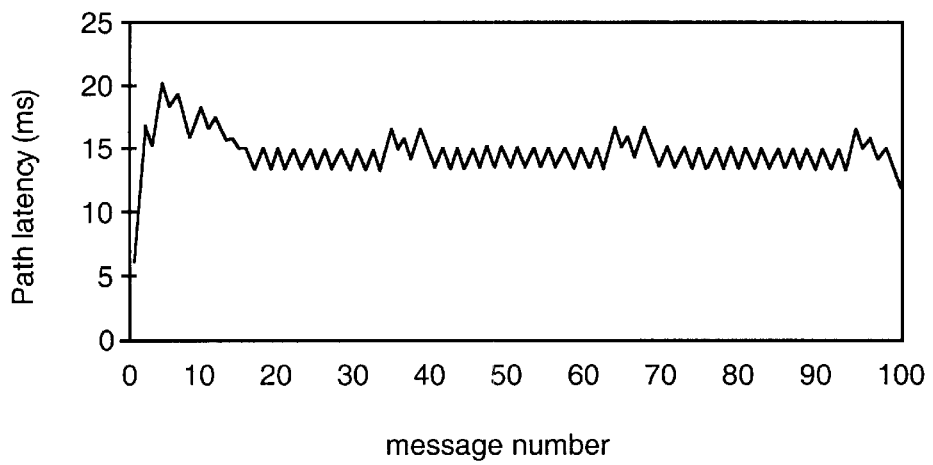
Figure 10C:
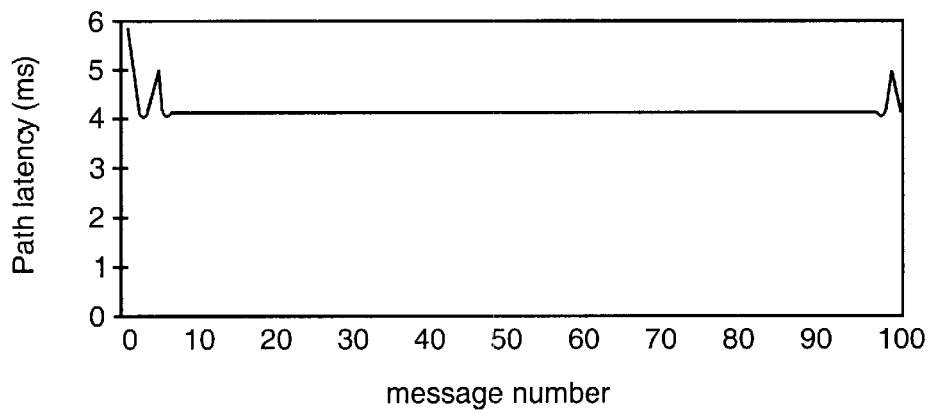

FIG. 10(*a*) illustrates the logical test configuration for the FEDS-GIGAswitch-Cisco 7513-BPX-BPX-Cisco 7513-GIGAswitch-Remote FEDS connectivity path for verifying successful packet transfer from a FEDS server to a BEDS server over the FDDI, with no extraneous routes, using subnet 3 (IP_3) (provisioning traffic). According to one embodiment of the FEDS-GIGAswitch-Cisco 7513-BPX-BPX-Cisco 7513-GIGAswitch-Remote FEDS benchmark test methodology of the invention, 100 messages are transmitted at 1 second intervals from the FEDS directed to the BEDS which returns the packets to the originating FEDS. After starting NPT test Daemons on systems F and A (see FIG. 3) using executable script startnpt, this test methodology is initiated on system C in accordance with executable test scripts entitled case16d (delay) and case16nd (no delay), with example scripts being provided in Appendix B. FIGS. 10(*b*) and 10(*c*) illustrate the packet delay results incurred when measuring the round trip times from the FEDS-Remote FEDS with a delay option (FIG. 10(*b*)) and without the delay option (FIG. 10(*c*)) according to these example test scripts.

Figure 11B:
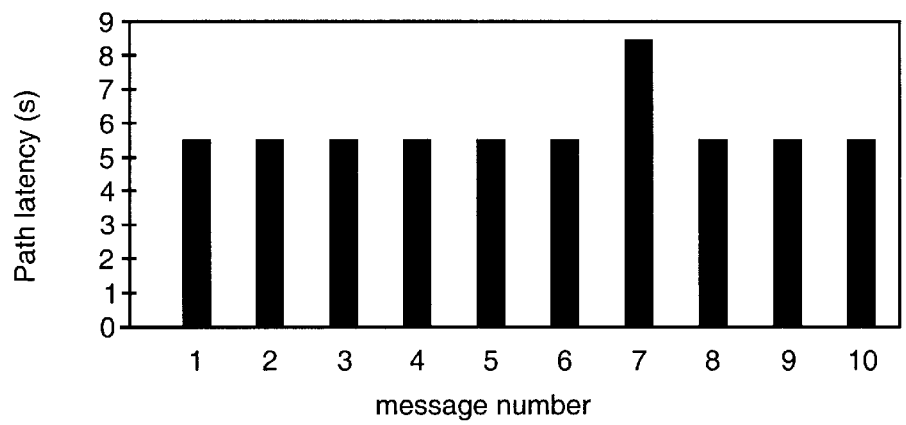
Figure 11C:
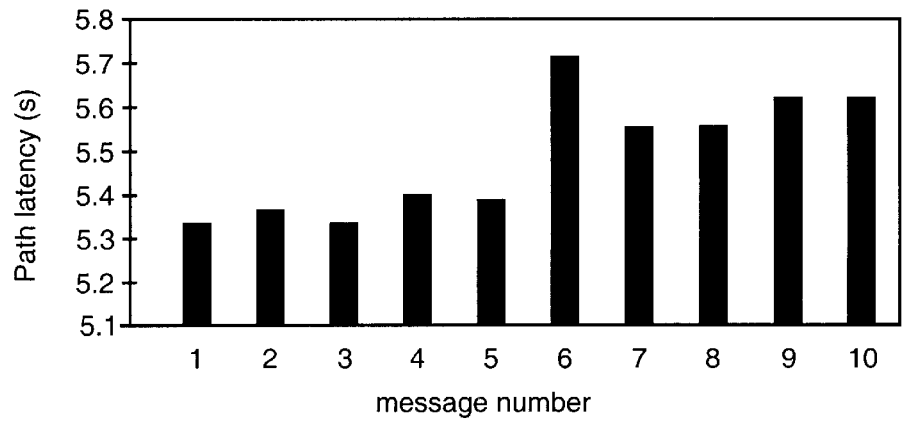

FIG. 11(*a*) illustrates the logical test configuration for the SS-GIGAswitch-Cisco 7513-BPX-BPX-Cisco 7513-GIGAswitch-RS connectivity path for verifying successful packet transfer from the SS to the RS over the WAN using subnet 4 (IP_4). According to one embodiment of the SS-GIGAswitch-Cisco 7513-BPX-BPX-Cisco 7513-GIGAswitch-RS benchmark test methodology of the invention, 10 messages of 7 Mbytes each, for example, are transmitted at 10 second intervals from the SS to the RS which redirects the messages back to the SS. After starting NPT test Daemons on systems F and A (see FIG. 3) using executable script startnpt, this test methodology is initiated on system A in accordance with executable test scripts entitled case17d (delay) and case17nd (no delay), with example scripts being provided in Appendix B. FIGS. 11(*b*) and 11(*c*) illustrate the packet delay results incurred when a test is run with a delay option (FIG. 11(*b*)) and without the delay option (FIG. 11(*c*)) according to these example test scripts.

Figure 12A:
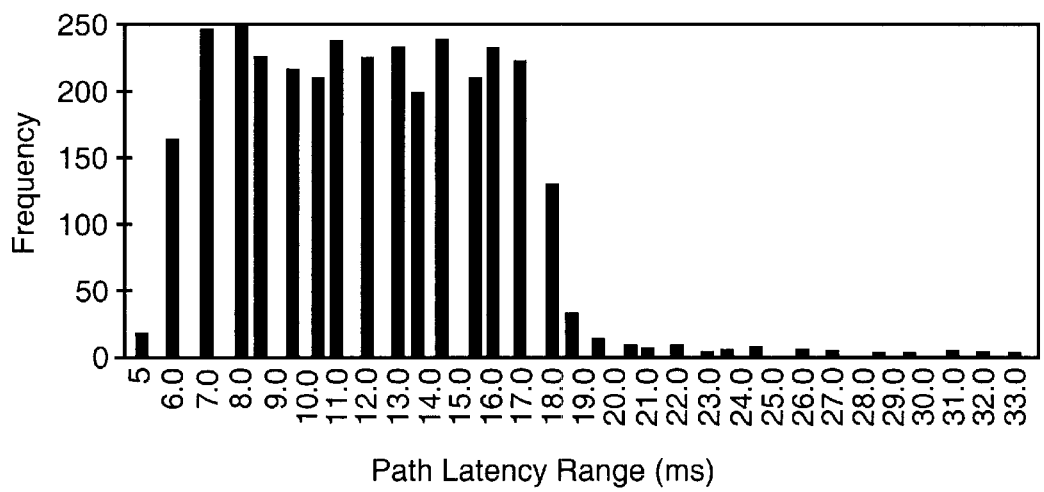
FIGS. 12(*a*) and 12(*b*) illustrate the path latency results when an example CPFR high load LAN real-time traffic benchmark test is run with a delay option (FIG. 12(*a*)) and without the delay option (FIG. 12(*b*)) according to the invention.
Figure 12B:
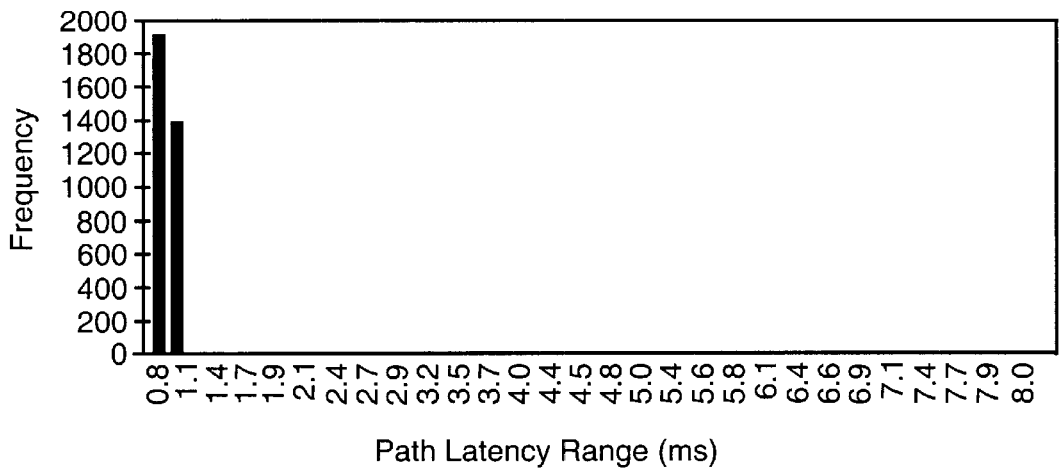

Further path validation and latency benchmark testing includes a test for verifying the impact of flooding the Call Processing LAN with real-time traffic (High load LAN latency, R/T traffic). For this test, reference is further made to the CS-CPFR-TS test connectivity path illustrated in FIG. 5(*a*). According to one embodiment of the CPFR LAN real-time high load traffic benchmark test methodology of the invention, 10,000 (204 byte) messages at 1 microsecond intervals are transmitted to the target system with the round trip times for example messages traversing this path recorded. Particularly, after starting NPT test Daemons on systems E and D (see FIG. 3) using executable script startnpt, as provided in Appendix B, this test methodology is initiated on system E in accordance with test scripts entitled case18d (delay) and case18nd (no delay), the example scripts being provided in Appendix B. FIGS. 12(*a*) and 12(*b*) illustrate the path latency (measured in ms) results when the example tests are run with a delay option (FIG. 12(*a*)) and without the delay option (FIG. 12(*b*)) according to these example test scripts. Successful performance criteria for this test includes receiving messages with latencies less than a predetermined timeout window.

Figure 13A:
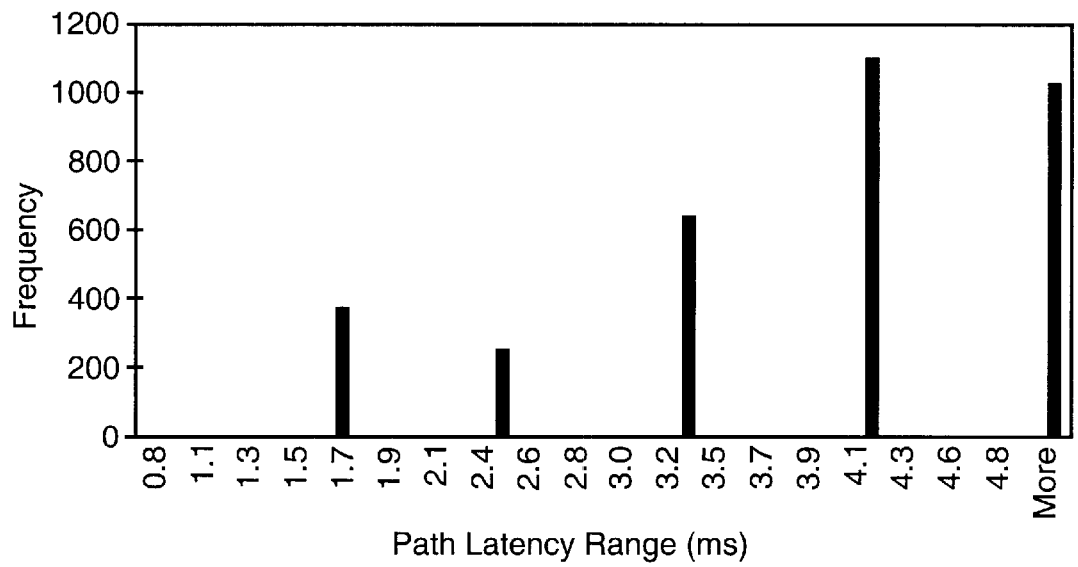
FIGS. 13(*a*) and 13(*b*) illustrate the path latency results when an example LAN High Load provisioning traffic benchmark test is run with a delay option (FIG. 13(*a*)) and without the delay option (FIG. 13(*b*)) according to the invention.
Figure 13B:
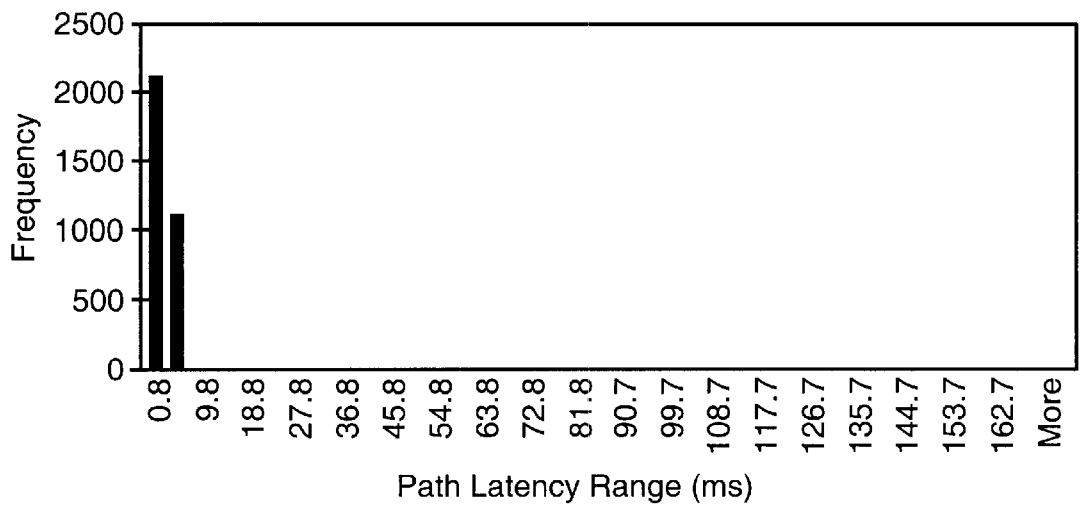

Another benchmark test includes a test for verifying the impact of flooding the Provisioning LAN with provisioning traffic (High load LAN latency, Provisioning traffic). For this test, reference is made to the TS-PFR-GIGAswitch-SS test connectivity path illustrated in FIG. 9(*a*). According to one embodiment of the PFR LAN high load provisioning traffic benchmark test methodology of the invention, 10,000 2,040 byte messages at 1 microsecond intervals are transmitted to the target system with the round trip times for example messages traversing this path recorded. Particularly, after starting NPT test Daemons on systems C and A (see FIG. 3) using executable script startnpt, this test methodology is initiated on system C in accordance with executable test scripts entitled case19d (delay) and case19nd (no delay), with example scripts being provided in Appendix B. Successful performance criteria for this test includes receiving messages. FIGS. 13(*a*) and 13(*b*) illustrate the path latency (measured in ms) results for the LAN High Load provisioning traffic tests with a delay option (FIG. 13(*a*)) and without the delay option (FIG. 13(*b*)) according to these example test scripts. It is understood that as long as messages are received, the test is considered successful.

Figure 14A:
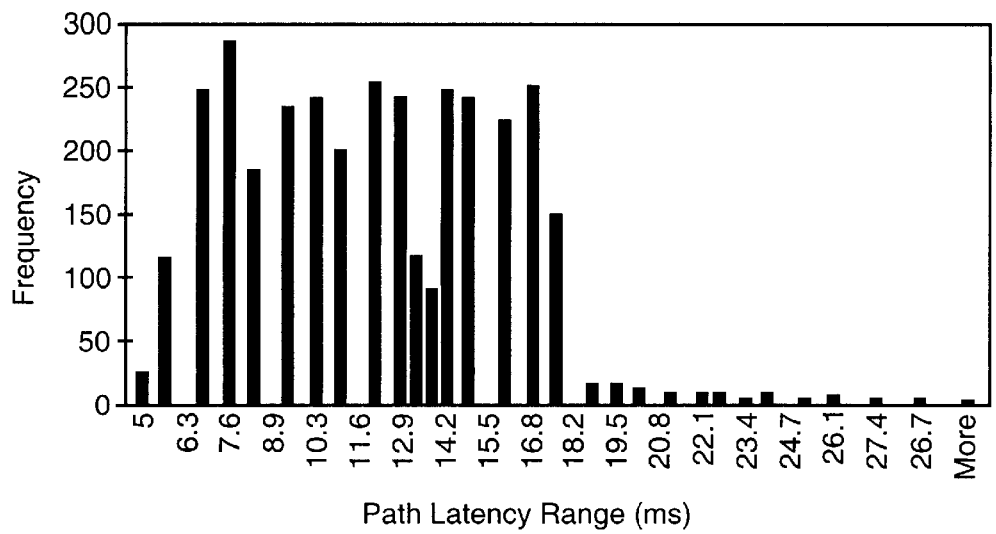
FIGS. 14(*a*) and 14(*b*) illustrate the path latency results when an example PFR WAN Real-Time High Load provisioning traffic benchmark test is run with a delay option (FIG. 14(*a*)) and without the delay option (FIG. 14(*b*)) according to the invention.
Figure 14B:
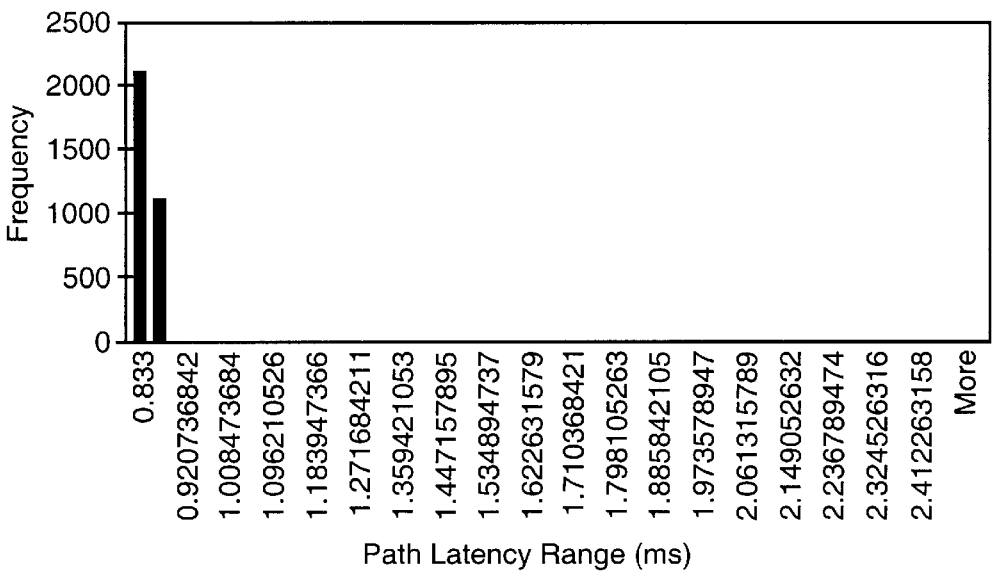

Further benchmark testing includes a test for verifying the impact of flooding the WAN with real-time traffic (High load WAN latency, R/T traffic). For this test, reference is made only to the ATS to GDS portion of the CS-CPFR-TS-CPFR-ATS-CPFR-Cisco 7513 FDDI-Cisco 7513 ATM-BPX-BPX-Cisco 7513 ATM-Cisco 7513 FDDI-CPFR-GDS (remote) connectivity path illustrated in FIG. 8(*a*). According to one embodiment of the WAN High Load R/T benchmark test methodology of the invention, 10,000 (204 byte) messages at 1 microsecond intervals are transmitted to the target system with the round trip times for example messages traversing this path recorded. Particularly, after starting NPT test Daemons on systems C and T (see FIG. 3) using executable script startnpt, this test methodology is initiated on system C in accordance with executable test scripts entitled case110d (delay) and case110nd (no delay), with example scripts being provided in Appendix B. FIGS. 14(*a*) and 14(*b*) illustrate the path latency results for the PFR WAN Real-Time High Load provisioning traffic tests when run with a delay option (FIG. 14(*a*)) and without the delay option (FIG. 14(*b*)) according to these example test scripts. Successful performance criteria for this test includes receiving messages with latencies less than a predetermined timeout window.

Figure 15A:
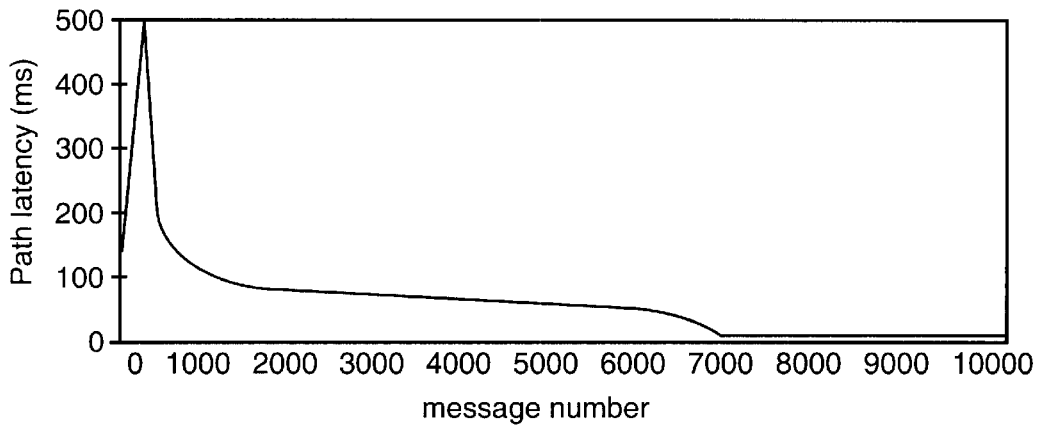
FIGS. 15(*a*) and 15(*b*) illustrate the path latency results when an example WAN Real-Time High Load provisioning traffic benchmark test is run with a delay option (FIG. 15(*a*)) and without the delay option (FIG. 15(*b*)) according to the invention.
Figure 15B:
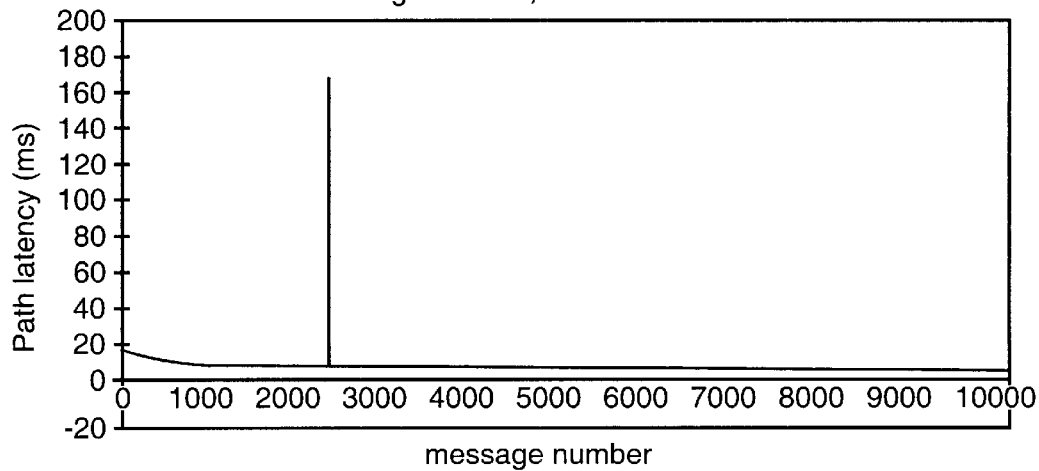

Another benchmark test includes a test for verifying the impact of flooding the Provisioning WAN with provisioning traffic (High load WAN latency, Provisioning traffic). For this test, reference is made to the FEDS-GIGAswitch-Cisco 7513-BPX-BPX-Cisco 7513-GIGAswitch-Remote FEDS connectivity path illustrated in FIG. 10(*a*). According to one embodiment of the WAN High Load Provisioning traffic benchmark test methodology of the invention, 10,000 2,040 byte messages are transmitted at 1 microsecond intervals to the target system with the round trip times for example messages traversing this path recorded. Particularly, after starting NPT test Daemons on systems F and A (see FIG. 3) using executable script startnpt, this test methodology is initiated on system A in accordance with executable test scripts entitled case111d (delay) and case111nd (no delay), with example scripts being provided in Appendix B. FIGS. 15(a) and 15(b) illustrate the path latency results for the WAN Real-Time High Load provisioning traffic tests with a delay option (FIG. 15(a)) and without the delay option (FIG. 15(b)) according to these example test scripts. Successful performance criteria for this test includes receiving messages.

Figure 16A:
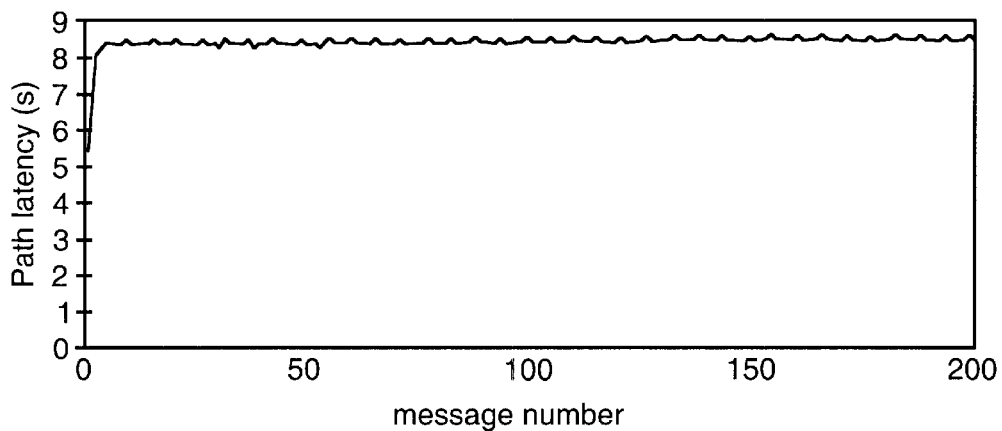
FIGS. 16(*a*) and 16(*b*) illustrate the path latency results incurred when an example WAN Statistics High Load traffic test is run with a delay option (FIG. 16(*a*)) and without the delay option (FIG. 16(*b*)).
Figure 16B:
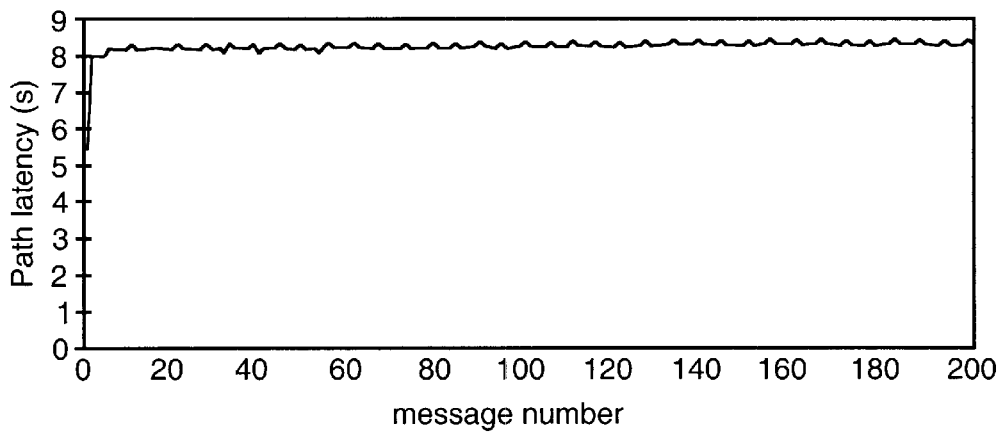

Further benchmark testing includes a test for verifying the impact of flooding the WAN with SS-RS traffic. For this test, reference is made to the SS-GIGAswitch-Cisco 7513-BPX-BPX-Cisco 7513-GIGAswitch-RS connectivity path (subnet I_4) illustrated in FIG. 11(a). According to one embodiment of the WAN High Load SS-RS benchmark test methodology of the invention, 200 seven (7 Mbyte) messages are transmitted at 1 microsecond intervals to the target system with the round trip times for example messages traversing this path recorded such as shown in FIG. 16(a) and 16(b). Particularly, after starting NPT test Daemons on systems A and F (see FIG. 3) using executable script startnpt, provided in Appendix B, this test methodology is initiated on systems A in accordance with executable test scripts entitled case112d (delay) and case112nd (no delay), with example scripts being provided in Appendix B. FIGS. 16(a) and 16(b) illustrate the path latency results incurred for the WAN Statistics High Load traffic tests with a delay option (FIG. 16(a)) and without the delay option (FIG. 16(b)).

A further benchmark test is provided for the purpose of demonstrating the performance of real-time packets between the ATS and (remote) GDS across the real-time PVC, while the provisioning and statistics PVC's are fully loaded. This represents a worst-case loading for the systems, routers and PVCs in the network of FIG. 2. The configuration for this WAN real-time, provisioning and statistics ultra high load test is depicted as the ATS to remote GDS portion of FIG. 8(a). For this test case, five servers were implemented, three servers of which functioning to send provisioning traffic (2040 byte messages), real time traffic (204 byte messages) and statistics traffic (7 Mb messages) simultaneously. One instance of each type of message from each server, across the WAN to two target servers, one to receive the provisioning and real-time data, the other to receive the statistics data. A successful performance measure of this case is that no packets are lost, and real-time packet latency is unaffected. For example, during testing, the provisioning and statistics BPX PVCs may be monitored at levels up to 70% utilized, with no data loss.

Dual NIC Cards

As mentioned above, a critical benchmark test includes the Dual NIC Impact test for testing the impact of dual FDDI NIC cards in an ATS system, i.e., measuring the effect on system resources of adding a second FDDI interface to an alpha system. According to the invention, the Dual NIC Impact test is configured to verify the following: a) that dual homing onto two double FDDI rings simultaneously works (i.e., may send/receive messages from both FDDI rings at the same time); b) verify the benchmark CPU overhead (dual vs single FDDI NIC); and, c) verify the benchmark I/O overhead (dual vs single FDDI NIC).

Figure 17:
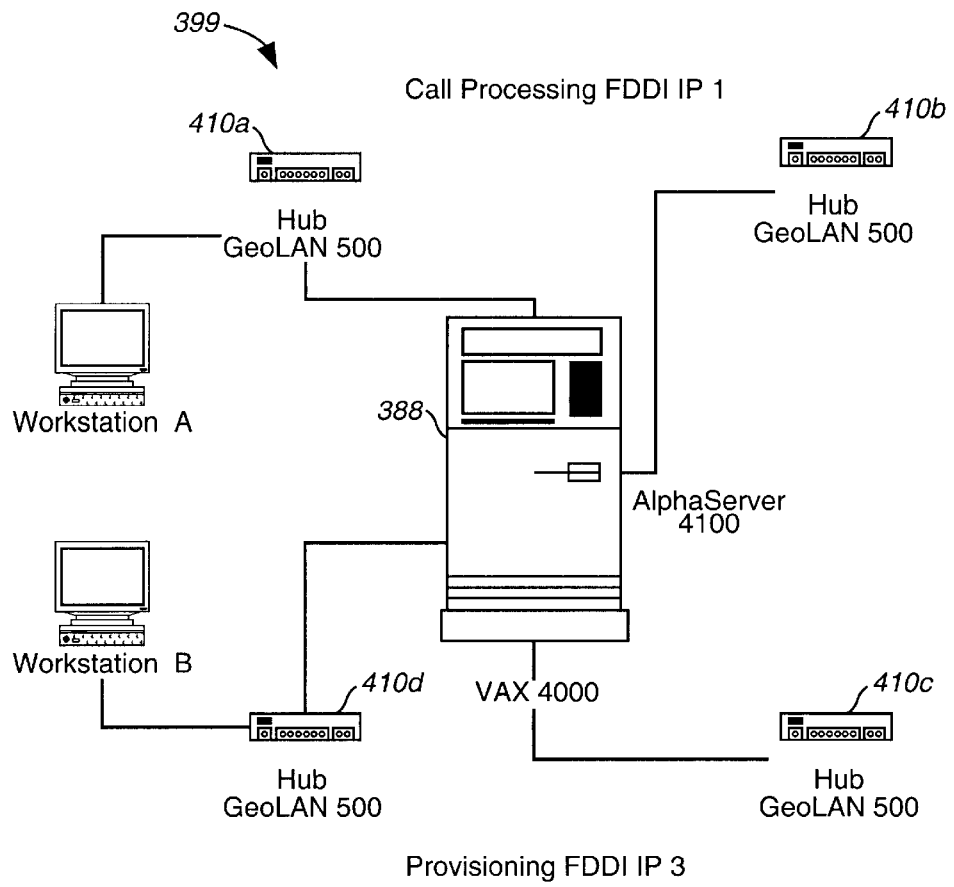
FIG. 17 illustrates a logical test configuration 400 for a Dual NIC Impact test according to the preferred embodiment of the invention.

FIG. 17 illustrates the logical test configuration 399 for the Dual NIC Impact test according to the preferred embodiment of the invention. As shown in FIG. 17, a transaction server (TS) 402, e.g., DEC AlphaServer 388 is interfaced with multiple, e.g., four GeoLAN Hubs (two FDDI interfaces) 410a, . . . ,410d. The testing involves utilizing a script to enable the NPT tool to set up multiple transfers, first split between two physical interfaces, and then the same transfers through a single interface. A "Vmstat" utility is used to collect performance data during the NPT test run. According to the Dual NIC Impact test, the following parameters are observed on the TS system 402 during the testing: a) throughput, in octets per second; b) total CPU utilization on the AlphaServer from all sources; c) CPU utilization by the system kernel of the AlphaServer; d) I/O rates for the FDDI cards in the AlphaServer; and, e) latency across the FDDI rings (end to end across the workstations' network stacks, including the NIC).

According to the preferred embodiment, the guideline for Dual NIC impact testing includes the following steps: Start vmstat on all servers, and direct output to a file; send a range of message rates to and from the AlphaServer 4100 simultaneously to and from two servers (Dual NIC Full-Duplex); and send a range of message rates to and from both servers to the AlphaServer 4100 (Dual NIC-Transmit and Receive). Traffic between server A and the AlphaServer 4100 may be 200 octets of application data (+IP overheads)—for simulating real-time traffic in the NIP configuration, and, traffic between server B and the AlphaServer 4100 may be a mixture of 200 octet messages and the maximum message size which IP supports for simulating non-real-time traffic (e.g. call plan downloads). Message rates may range from low load up to and beyond the maximum designed call processing capacity. Preferably, the tests are run for approximately 10 minutes each with five iterations of each test being run, in order to provide a confidence level for the test results.

For a Dual NIC Transmit (High Load) test case scenario the following steps are performed: Referring to FIG. 3, server B is first connected to the GeoLAN FDDI hub P; a vmstat script stat541 provided in Appendix B, is initiated on system C for directing the output to a file. The NPT daemons are then started on systems B, C and D using script startnpt. Then, the script case541txhigh is started on system C which script is provided in Appendix B. After about ten (10) minutes, in a preferred embodiment, the npt is stopped on system C.

For a Dual NIC Receive (High Load) test case scenario the following steps are performed: Referring to FIG. 3, server B is first connected to the GeoLAN FDDI hub P; a vmstat script stat542, provided in Appendix B, is initiated on system C for directing the output to a file. The NPT daemons are then started on systems B, C and D using script startnpt. Then, a script case542rxhighp is started on system B and a script case542rxhighc is started on system D by coordinated console actions. After about ten (10) minutes, in a preferred embodiment, the npt is stopped on systems B and D.

For a Dual NIC Full Duplex (High Load) test case scenario the following steps are performed: Referring to FIG. 3, server B is first connected to the GeoLAN FDDI hub P; a vmstat script stat543, provided in Appendix B, is initiated on system C for directing the output to a file. The NPT daemons are then started on systems B, C and D using script startnpt. Then, a script case543fdhighp is started on system B and a script case543fdhighc is started on system D by coordinated console actions. After about ten (10) minutes, in a preferred embodiment, the npt is stopped on systems B and D. Preferably, the dual NIC procedure is repeated several times, e.g., three times, at each of three packet output rates: 2K output (4K total I/O), 4K output (8K total I/O), and 6K output (12K total I/O).

Failover/Failback

As mentioned above, a critical benchmark test includes the failover/failback tests for determining failover and failback times for each single component failure. The configuration for these sets of tests are similar to the benchmark topology for the LAN path and latency tests. In the LAN path and latency tests, the goal was to check if the traffic was using the expected routes. In the failover and failback tests, the aim is to measure failover times for each communications component. Successful failover/failback criteria are based on parameters including response times (before, during, and after failover), failover time to backup device, failback times from failback device to newly recovered primary device. Additionally, the effect on link status and routing may be monitored. Absolute success is determined by the observed data. For example, failover recovery times exceeding two (2) seconds is deemed excessive. Any detrimental effect on LAN/WAN routing capability, e.g., the inducement of unacceptable routes in failure recovery attempts, is additionally deemed unacceptable.

In the preferred embodiment, the failover and failback tests are structured so that each single communications component is failed in turn with each failed component being brought back into service to measure failback times. The components targeted for failure include: the GeoLAN hub to GeoLAN hub; the Gigaswitch (use the data from the IP testing); the GIGAswitch to GeoLAN link; and, the 7513 router. Particularly, for the test scenarios, a constant stream of real-time traffic is provided between two (2) of these components and the impact of failover and failback on response times is measured when a component is failed.

A first set of tests is devised to measure failover to backup performance including: 1) a failure from the primary GeoLAN to the backup GeoLAN under message loading of 100 messages per second; 2) a failure from the primary GIGAswitch to the backup GIGAswitch under message loading of 100 messages per second; 3) a failure from the primary GIGAswitch to GeoLAN link to the backup GIGAswitch to GeoLAN link under message loading of 100 messages per second; and, 4) a failure from the primary Cisco 7513 router to the backup Cisco 7513 router under message loading of 100 messages per second.

A second set of tests is devised to measure failback to primary performance including: 1) a failure from the primary GeoLAN to the backup GeoLAN under message loading of 100 messages per second, and, after recovery of the primary system, failback to the primary; 2) a failure from the primary GIGAswitch to the backup GIGAswitch under message loading of 100 messages per second and, after recovery of the primary system, failback to the primary; 3) a failure from the primary GIGAswitch to the GeoLAN link to the backup GIGAswitch to GeoLAN link under message loading of 100 messages per second, and then failback; and, 4) a failure from the primary Cisco 7513 router to the backup Cisco 7513 router under message loading of 100 messages per second, and, after recovery of the primary system, failback to the primary.

With respect to the first set of tests for measuring failover to backup performance, a first test case is implemented for testing primary GeoLAN to the backup GeoLAN failover performance. For this first test case, a hub power failure is implemented as the primary GeoLAN to the backup GeoLAN failure, e.g., by removing power to the GeoLAN. The net effect of this failover is to fail the hub and the interfaces on the servers. The hardware setup comprises two Alphaservers and two GeoLAN hubs (reference is had to FIG. 3). The NPT tool is configured to send real-time messages of 204 octets once per millisecond, using the UDP protocol. Particularly, the test is as follows: in a first step, hubs P and Q are disconnected from the GIGAswitch (FIG. 3). Next, servers B and C are dual home connected to hubs P and Q, ensuring the B port for servers B and C goes to hub P. Then, nptd test script startnptdudp is then started (in UDP mode) on servers B and C such as provided in Appendix B. Then script case5111 is executed on server B for generating a stream of 100 messages/second, for example. Then, hub P is powered down five (5) seconds after starting script case5111. After 10 seconds, the npt tool is stopped on server B. Finally, a "ps" (process status) command is performed that requests a list of all processes running on the systems. This list is then piped to a "grep" command, (Get Regular Expression), which looks for lines containing the string npt, and prints those lines to screen. These lines contain the process ID. Then, the process ID taken from the previous step is terminated, without recourse by the process, by executing a kill command.

In an example test run, the net effect of the failover resulted in no messages being lost. However, several messages were delayed, e.g., starting with a 25 millisecond delay on the first message, with subsequent messages' delays shortening in a linear fashion to the normal latency period.

For the second test case, an interface disconnect failure is implemented as the primary GeoLAN to the backup GeoLAN failure, e.g., by removing the "B" port connection to the receiving server on the primary hub and inducing failback after the initial failover recovery. The NPT tool is configured to send real-time messages of 204 octets once per millisecond, for example, using the UDP protocol. Particularly, the test is as follows: in a first step, hubs P and Q are disconnected from the GIGAswitch (FIG. 3). Next, servers B and C are dual home connected to hubs P and Q, ensuring the B port for servers B and C goes to hub P. Then, the nptd test daemon is started (in UDP mode) on servers B and C implementing the script startnptdudp such as provided in Appendix B. Then script case5112 is executed on server B for generating a stream of 100 messages/second, for example. Then, port "B" is disconnected on hub P connected to server B five (5) seconds after starting script case5112. After 10 seconds, the npt tool is stopped on server B. Finally, the above-described "ps" (process status), "grep" command, and kill commands are executed.

For the next series of cases in this first test set, primary GIGAswitch to backup GIGAswitch failover performance is tested. For the first test case, a switch power failure is induced Particularly, the test is as follows: in a first step, servers A and B are dual home connected to switches J and K, ensuring the B port for each server A and B goes to switch J. Next, the nptd test daemon is started (in UDP mode) on servers A and B using script startnptdudp such as provided in Appendix B. Then, script case5121 is executed on server B for generating a stream of 100 messages/second, for example. Then, switch J is powered down about five (5) seconds after starting the case5121 script. After 10 seconds, the npt tool is terminated on server B. Finally, the above-described "ps" (process status), "grep" command, and kill commands are executed.

For the next test case, primary GIGAswitch to backup GIGAswitch failover performance is tested when inducing an interface disconnect failure while the NPT tool is configured to send real-time messages using the UDP protocol. Particularly, in a first step, servers A and B are dual home connected to switches J and K, ensuring the B port for each server A and B goes to hub P. Then, the nptd test daemon is started (in UDP mode) on servers A and B implementing the script startnptdudp. Then script case5122 is executed on server B for generating a stream of 100 messages/second, for example. Then, port "B" is disconnected from switch J connected to server B five (5) seconds after starting script case5122. After 10 seconds, the npt tool is stopped on server B. Finally, the above-described "ps" (process status), "grep" command, and kill commands are executed.

For the next series of cases in this first test set, primary GIGAswitch to GeoLAN Link to Backup GIGAswitch to GeoLAN Link failover performance is measured. For the first test case of this series, a switch power failure is induced by removing power to the switch. Particularly, the test is as follows: in a first step, server B is dual home connected to switches J and K, ensuring the B port for server B goes to switch J. It is additionally ensured that the A and B ports on hubs P and Q are connected to M ports on GIGAswitches J and K. Next, the nptd test daemon is started (in UDP mode) on servers B and C using script startnptdudp. Then, script case5131 is executed on server B for generating a stream of 100 messages/second, for example. Then, switch J is powered down about five (5) seconds after starting the case5131 script. After 10 seconds, the npt tool is terminated on server B. Finally, the above-described "ps" (process status), "grep" command, and kill commands are executed.

For the next test case, primary GIGAswitch to GeoLAN Link to Backup GIGAswitch to GeoLAN Link failover performance is measured when inducing an interface disconnect failure. Particularly, the test is as follows: in a first step, server B is dual home connected to switches J and K, ensuring the B port for server B goes to switch J. It is additionally ensured that the A and B ports on hubs P and Q are connected to M ports on GIGAswitches J and K. Next, the nptd test daemon is started (in UDP mode) on servers B and C using script startnptdudp. Then, script case5132 is executed on server B for generating a stream of 100 messages/second, for example. Then, the B port is disconnected from switch J connected to GeoLAN P about five (5) seconds after starting the case5132 script. After 10 seconds, the npt tool is terminated on server B. Finally, the above-described "ps" (process status), "grep" command, and kill commands are executed.

For the next series of cases in this first set, primary Router to backup Router failover performance is measured. In a first test case of this series, a router power failure is induced. Particularly, in a first step, the nptd test daemon is started (in UDP mode) on servers A and E using script startnptdudp. Next, a script case5141 is executed on server A for generating a stream of 100 messages/second, for example. Then, the primary router H is powered down five about (5) seconds after starting the script case5141, and, about 30 seconds thereafter, the npt tool is terminated on server A. Finally, the above-described "ps" (process status), "grep" command, and kill commands are executed.

In an example failover test run, for example, a UDP packet stream is sent from the b1ss01 server round trip to a distant system via the Cisco 7513 routers (FIG. 3). The routers were set up using HSRP as the failover mechanism. The primary router was then powered off. The characteristics of the failovers on the routers due to power loss include: calculation of event duration from the start of the buffer loss, e.g., at one millisecond per buffer, to the end of the buffer delay period, where the delay returns to the nominal delay value.

For the next test case, primary Router to backup Router failover performance is measured when inducing an interface disconnect failure at the router. Particularly, in a first step, the nptd test daemon is started (in UDP mode) on servers A and E using script startnptdudp (See Appendix B). Next, script case5142 is executed on server A for generating a stream of 100 messages/second, for example. Then, both FDDI ports on the primary router H are disconnected about five about (5) seconds after starting script, and, after about 30 seconds, the npt tool is terminated on server A. Finally, the "ps" (process status), "grep" command, and kill commands are executed.

With respect to the second set of tests for measuring failback to primary performance, a first series of test cases is implemented for testing primary GeoLAN to the backup GeoLAN failure and failback. In a first series of tests, a hub power failure is induced, e.g., by removing power to the GeoLAN and, a recovery is implemented by again powering up the hub. For the first test case, reference is had to FIG. 3. In a first step, hubs P and Q are disconnected from the GIGAswitch and, servers B and C are dual home connected to hubs P and Q, ensuring the B port for each server B and C goes to hub P. Next, the nptd test daemon is started (in UDP mode) on servers B and C using script startnptdudp and script case5211 is executed on server B for generating a stream of 100 messages/second, for example. Then, the hub P is powered down about five (5) seconds after starting the case5211 script. After about 10 seconds thereafter, hub P is powered up and, after about 15 seconds thereafter, hub Q is powered down. Then, about 10 seconds after powering down hub Q, the npt tool is terminated on server B. Finally, the "ps" (process status), "grep" command, and kill commands are executed.

For the next test case, primary GeoLAN to the backup GeoLAN failure and failback performance is tested when inducing an interface disconnect, e.g., by removing the "B" port connection to the receiving server on the primary hub and, executing recovery. Particularly, the test is as follows: in a first step, hubs P and Q are disconnected from the GIGAswitch (FIG. 3). Next, servers B and C are dual home connected to hubs P and Q, ensuring the B port for servers B and C goes to hub P. Then, the nptd test daemon is started (in UDP mode) on servers B and C implementing the script startnptdudp. Then, script case5212 is executed on server B for generating a stream of 100 messages/second, for example. Then, the port "B" connected to server B is disconnected from hub P about five (5) seconds after starting script case5212. After about 10 seconds thereafter, the port B is reconnected on hub P connected to server B and, after about 15 seconds thereafter, the port B is disconnected on hub Q connected to server B. Then, about 10 seconds after that, the npt tool is terminated on server B. Finally, the "ps" (process status), "grep" command, and kill commands are executed.

In an example test run, a first failure caused approximately 240 messages to be lost during the failover; and, on recovery, the next 107 messages are delayed, with the first message delayed by approximately 250 ms with subsequent messages being delayed by shortening time periods. The amount of delay shortens in a linear fashion to the normal latency period.

For the next series of cases, primary GIGAswitch to backup GIGAswitch failover and failback performance is tested. In a first case, performance is measured when a switch power failure and recovery is induced. This case entails, dual home connecting servers A and B to switches J and K, ensuring that the B port for servers A and B goes to switch J. Then, the nptd test daemon is started (in UDP mode) on servers A and B implementing the script startnptdudp and, script case5221 is started on server A for generating a stream of 100 messages/second, for example. Next, switch J is powered down about five (5) seconds after starting script case5221. Then, after 10 seconds, the GIGAswitch J is powered up. After about 15 seconds, GIGAswitch K is powered down. Then, about 10 seconds after that, the npt tool is terminated on server A. Finally, the "ps" (process status), "grep" command, and kill commands are executed.

In an example test run, no messages were lost during the failover test run. However, for the case of failover/failback, a series of test runs proved out that on recovery, all delays of subsequent messages shorten in a linear fashion to the normal latency period.

For the next test case, primary GIGAswitch to backup GIGAswitch failover and failback performance is tested when performing an interface disconnect and executing recovery. In a first step, servers A and B are dual home connected to switches J and K (FIG. 3), ensuring the B port for servers A and B is connected to switch J. Then, the nptd is started in UDP mode on servers A and B by using script startnptdudp and script case5222 is started on server A for generating a stream of 100 messages/second, for example. Next, the B port on switch J connected to server A is disconnected about five (5) seconds after starting script. After about 10 seconds, the B port is reconnected on switch J connected to server A. Then, after 15 seconds, the B port is disconnected on switch K connected to server A, and after 10 seconds, the tool is stopped on server A. Finally, the "ps" (process status), "grep" command, and kill commands are executed.

For the next series of cases, primary GIGAswitch to GeoLAN Link to backup GIGAswitch to GeoLAN Link failover and failback performance is tested. For the first case of this series, performance is measured when a switch power failure is induced. For this test, server B is dual home connected to switches J and K, ensuring the B port for server B goes is connected to switch J. It is additionally ensured that the A and B ports on hubs P and Q are connected to M ports on GIGAswitches J and K. Then, the nptd is started in UDP mode on servers B and C by using script startnptdudp and script case5231 is started on server B for generating a stream of 100 messages/second, for example. Then, switch J is powered down 5 seconds after starting script case5231. After about 15 seconds, switch J is powered up and about 15 seconds thereafter, switch K is powered down. Then, the npt tool is stopped on server B after about 10 seconds thereafter. Finally, the "ps" (process status), "grep" command, and kill commands are executed.

For the next test case of this series, primary GIGAswitch to GeoLAN Link to backup GIGAswitch to GeoLAN Link failover and failback performance is tested when performing an Interface Disconnect. In a first step, server B is dual home connected to switches J and K, ensuring the B port for servers B and C goes to switch J. It is additionally ensured that the A and B ports on hubs P and Q are connected to M ports on GIGAswitches J and K. Then, the nptd is started in UDP mode on servers B and C by using script startnptdudp and script case5232 is started on server B for generating a stream of 100 messages/second, for example. Then, the M port on switch J connected to GeoLAN P is disconnected about five (5) seconds after starting the script case5232. After about 15 seconds, the M port on switch J is reconnected and, about 15 seconds thereafter, the M port on switch K connected to GeoLAN P is disconnected. Then, the npt tool is stopped on server B after about 10 seconds thereafter. Finally, the "ps" (process status), "grep" command, and kill commands are executed.

For the next series of cases, Primary Router to Backup Router failover and failback performance is tested. For the first case of this series, performance is measured when a router power failure and recovery is induced. In a first step, the nptd is started in UDP mode on servers A and E (FIG. 3) by using script startnptdudp and script case5241 is started on server A for generating a stream of 100 messages/second, for example. Then, the primary router H is powered down 5 seconds after starting script case5241. After about 30 seconds, router H is powered up and about 30 seconds thereafter, router I is powered down. Then, the npt tool is stopped on server A about 30 seconds thereafter. Finally, the "ps" (process status), "grep" command, and kill commands are executed.

For the next test case, Primary Router to Backup Router failover and failback performance is tested by performing an Interface Disconnect. In a first step, the nptd is started in UDP mode on servers A and E (FIG. 3) by using script startnptdudp and script case5242 is started on server A for generating a stream of 100 messages/second, for example. Then, both FDDI ports on the primary router H are disconnected about five (5) seconds after starting script case5242. After about 30 seconds, the FDDI ports to router H are reconnected. Then, after about 15 seconds, both FDDI ports on router I are disconnected. After 15 seconds, the npt tool on server A is terminated. Finally, the "ps" (process status), "grep" command, and kill commands are executed.

In an example failover/failback test run, an UDP packet stream is sent from the b1ss01 server (FIG. 3) round trip to a distant system via the Cisco 7513 routers. The routers are set up using HSRP as the failover mechanism. The primary router then had the FDDI interface disconnected. The resulting characteristics of the failovers and failback on the routers due to interface loss include a measurement of the event duration from the start of deviation from the nominal latency to the recovery to the nominal latency by the total number of delayed buffers, e.g., when transmitted at one millisecond intervals.

The novel benchmark testing methodology described herein fully proves out the performance benefits, resiliency and redundancy designed into the NIP LAN/WAN of the invention. Functionally, the benchmark configuration and test described herein proves that the LAN/WAN design of the invention successfully segments the various traffic types, both within the LAN, and across the WAN. Further, it has been demonstrated that performance of the real-time traffic, including the cross WAN ATS-GDS traffic, is unaffected by provisioning and statistics traffic. Real time packet latencies (all latencies are measured as round-trip) across the WAN are proven to be approximately in the 1.6 ms range, regardless of other WAN traffic levels. This does not include WAN propagation delays which measure in the 10–14 ms range on the NIP production sites. Without traffic segregation afforded by the network topology of the invention, real-time packet latencies may increase above 7 seconds when the links are subject to heavy loads.

The foregoing merely illustrates the principles of the present invention. Those skilled in the art will be able to devise various modifications, which although not explicitly described or shown herein, embody the principles of the invention and are thus within its spirit and scope.

APPENDIX A - IP Addressing

| Interface Unique Name | Device Name | IP Address |
|---|---|---|
| b1ss0101 | Alpha A subnet 1 | 172.25.68.34 |
| b1ss0102 | Alpha A subnet 2 | 172.25.68.69 |
| b1ss0103 | Alpha A subnet 3 | 172.25.68.98 |
| b1ss0104 | Alpha A subnet 4 | 172.25.68.130 |
| b1rs0103 | Alpha B subnet 3 | 172.25.68.99 |
| b1rs0104 | Alpha B subnet 4 | 172.25.68.131 |
| b1at0101 | Alpha C subnet 1 | 172.25.68.35 |
| b1at0102 | Alpha C subnet 2 | 172.25.68.66 |
| b1at0103 | Alpha C subnet 3 | 172.25.68.100 |
| b1ts0101 (b1ts01) | Alpha D subnet 1 | 172.25.68.36 |
| b1ts0102 | Alpha D subnet 2 | 172.25.68.67 |
| b1cs0101 (b1cs01) | Alpha E subnet 1 | 172.25.68.37 |
| b1gd0102 | Alpha B subnet 2 (only if connected to hub R) | 172.25.68.68 |
| b2fe0102 | Alpha F subnet 2 | 172.25.69.67 |
| b2fe0103 | Alpha F subnet 3 | 172.25.69.98 |
| b2gd0101 | Alpha T subnet 1 | 172.25.69.34 |
| b2gd0102 | Alpha T subnet 2 | 172.25.69.66 |
| b3ss0103 | Alpha T subnet 3 (only when configured to hub Q) | 172.25.70.98 |
| b3ss0104 | Alpha T subnet 4 (only when configured to hub Q) | 172.25.70.129 |
| b2rtvi01 | Cisco 7513 G FDDI 0 | 172.25.69.33 |
| b2rtvi02 | Cisco 7513 G FDDI 1 | 172.25.69.65 |
| b2rtvi03 | Cisco 7513 G FDDI 2 | 172.25.69.97 |
| b2rtvi04 | Cisco 7513 G FDDI 2 | 172.25.69.132 |
| b1rtvi01 | Cisco 7513 H FDDI 0 | 172.25.68.33 |
| b1rtvi02 | Cisco 7513 H FDDI 1 | 172.25.68.65 |
| b1rtvi03 | Cisco 7513 H FDDI 2 | 172.25.68.97 |
| b1rtvi04 | Cisco 7513 H FDDI 2 | 172.25.68.132 |
| b3rtvi01 | Cisco 7513 I FDDI 0 (only when separated from router H) | 172.25.70.33 |
| b3rtvi02 | Cisco 7513 I FDDI 1(only when separated from router H) | 172.25.70.65 |
| b3rtvi03 | Cisco 7513 I FDDI 2(only when separated from router H) | 172.25.70.97 |
| b3rtvi04 | Cisco 7513 I FDDI 2(only when separated from router H) | 172.25.70.132 |

Benchmark Subnet Design

IP Class: C  IP Address: 172.25.68.0
Mask Bits: 3  Subnet Mask: 255.255.255.224
Subnets: 6+1  IP Major Net: 172.25.68.0
Hosts/Subnet: 30  Major Net Broadcast: 172.25.68.255

Don't use subnet 0 (unless using ip subnet-zero command) and subnet 7.

| No. | Subnet Address | Hosts From | Hosts To | Broadcast Address |
|---|---|---|---|---|
| 0 | 172.25.68.0 | 172.25.68.1 | 172.25.68.30 | 172.25.68.31 |
| 1 | 172.25.68.32 | 172.25.68.33 | 172.25.68.62 | 172.25.68.63 |
| 2 | 172.25.68.64 | 172.25.68.65 | 172.25.68.94 | 172.25.68.95 |
| 3 | 172.25.68.96 | 172.25.68.97 | 172.25.68.126 | 172.25.68.127 |
| 4 | 172.25.68.128 | 172.25.68.129 | 172.25.68.158 | 172.25.68.159 |
| 5 | 172.25.68.160 | 172.25.68.161 | 172.25.68.190 | 172.25.68.191 |
| 6 | 172.25.68.192 | 172.25.68.193 | 172.25.68.222 | 172.25.68.223 |
| 7 | 172.25.68.224 | 172.25.68.225 | 172.25.68.254 | 172.25.68.255 |

Benchmark PVC Setup

| Device | Interface | WAN | Virtual Circuit | Router VPI/VCI | Maps to Switch VPI/VCI | Reaches IP Address | Destination Device Port |
|---|---|---|---|---|---|---|---|
| 7513 router H | ATM 0 | 2xE3 | 5.1 | 40.801 | 40.791 | 172.25.69.161 | 7513 G ATM 0 PVC 1 |
| 7513 router H | ATM 0 | 2xE3 | 6.1 | 40.803 | 40.792 | 172.25.69.164 | 7513 G ATM 0 PVC 2 |
| 7513 router H | ATM 0 | 2xE3 | 7.1 | 40.805 | 40.797 | 172.25.69.167 | 7513 G ATM 0 PVC 3 |
| 7513 router H | ATM 0 | 2xE3 | 5.1 | 40.807 | 40.795 | 172.25.69.170 | 7513 I ATM 0 PVC 1 (not initial setup) |
| 7513 router H | ATM 0 | 2xE3 | 6.1 | 40.809 | 40.796 | 172.25.69.173 | 7513 I ATM 0 PVC 2 (not initial setup) |
| 7513 router H | ATM 0 | 2xE3 | 7.1 | 40.811 | 40.799 | 172.25.69.176 | 7513 I ATM 0 PVC 3 (not initial setup) |

| Device | Interface | WAN | Virtual Circuit | Router VPI/VCI | Maps to Switch VPI/VCI | Reaches IP Address | Destination Device Port |
|---|---|---|---|---|---|---|---|
| 7513 I router | ATM 0 | 2xE3 | 5.1 | 40.815 | 40.791 | 172.25.69.162 | Cisco 7513 G ATM 0 PVC4 |
| 7513 I router | ATM 0 | 2xE3 | 6.1 | 40.817 | 40.792 | 172.25.69.165 | Cisco 7513 G ATM 0 PVC 5 |

| Device | Interface | WAN | Virtual Circuit | Router VPI/VCI | Maps to Switch VPI/VCI | Reaches IP Address | Destination Device Port |
|---|---|---|---|---|---|---|---|
| 7513 I router | ATM 0 | 2xE3 | 7.1 | 40.819 | 40.813* | 172.25.69.168 | Cisco 7513 G ATM 0 PVC 6 |
| 7513 I router | ATM 0 | 2xE3 | 5.1 | 40.808 | 40.793 | 172.25.69.171 | Cisco 7513 H ATM 0 PVC 4 |
| 7513 I router | ATM 0 | 2xE3 | 6.1 | 40.810 | 40.794 | 172.25.69.174 | Cisco 7513 H ATM 0 PVC 5 |
| 7513 I router | ATM 0 | 2xE3 | 7.1 | 40.812 | 40.800* | 172.25.69.177 | Cisco 7513 H ATM 0 PVC 6 |

| Device | Interface | WAN | Virtual Circuit | Router VPI/VCI | Maps to Switch VPI/VCI | Reaches IP Address | Destination Device Port |
|---|---|---|---|---|---|---|---|
| Cisco 7513 G router | ATM 0 | 2xE3 | 5.1 | 40.802 | 40.793 | 172.25.69.163 | Cisco 7513 H ATM 0 PVC 1 |
| Cisco 7513 G router | ATM 0 | 2xE3 | 6.1 | 40.804 | 40.794 | 172.25.69.166 | Cisco H 7513 ATM 0 PVC 2 |
| Cisco 7513 G router | ATM 0 | 2xE3 | 10.1 | 40.806 | 40.798* | 172.25.69.169 | Cisco H 7513 ATM 0 PVC 3 |
| Cisco 7513 G router | ATM 0 | 2xE3 | 5.1 | 40.816 | 40.795 | 172.25.69.172 | Cisco 7513 I ATM 0 PVC 1 |
| Cisco 7513 G router | ATM 0 | 2xE3 | 6.1 | 40.818 | 40.796 | 172.25.69.175 | Cisco 7513 I ATM 0 PVC 2 |
| Cisco 7513 G router | ATM 0 | 2xE3 | 10.1 | 40.820 | 40.814* | 172.25.69.178 | Cisco 7513 I ATM 0 PVC 3 | etc/hosts File

```
# hosts file for NIP2 benchmark testing

# format of entries:
# addr            interface-name    [host-name]

# 1st site subnet 1
172.25.68.33      b1rtvi01
172.25.68.34      b1ss0101
172.25.68.35      b1at0101
172.25.68.36      b1ts0101          b1ts01
172.25.68.37      b1cs0101          b1cs01

# 1st site subnet 2
172.25.68.65      b1rtvi02
172.25.68.66      b1at0102
172.25.68.67      b1ts0102
172.25.68.68      b1gd0102
172.25.68.69      b1ss0102

# 1st site subnet 3
172.25.68.97      b1rtvi03
172.25.68.98      b1ss0103          b1ss01
172.25.68.99      b1rs0103          b1rs01
172.25.68.100     b1at0103          b1at01

# 1st site subnet 4
172.25.68.132     b1rtvi04
172.25.68.130     b1ss0104
172.25.68.131     b1rs0104

# 2nd site subnet 1
172.25.69.33      b2rtvi01
172.25.69.34      b2gd0101          b2gd01

# 2nd site subnet 2
172.25.69.65      b2rtvi02
172.25.69.66      b2gd0102
172.25.69.67      b2fe0102

# 2nd site subnet 3
172.25.69.97      b2rtvi03
172.25.69.98      b2fe0103          b2fe01

# 2nd site subnet 4
172.25.69.132     b2rtvi04

# 3rd site subnet 3
172.25.70.33      b3rtvi01
```

```
#   3rd site subnet 2
172.25.70.65      b3rtvi02

#   3rd site subnet 3
172.25.70.97      b3rtvi03
172.25.70.98      b3ss0103          b3ss01

#   3rd site subnet 4
172.25.70.132     b3rtvi04
172.25.70.129  b3ss0104
```

APPENDIX B - Test Scripts

*startnpt*

```
/test/bin/nptd -p2001 -z -t1 -d/test/data/2001.log
/test/bin/nptd -p2002 -z -t1 -d/test/data/2002.log
/test/bin/nptd -p2003 -z -t1
/test/bin/nptd -p2004 -z -t1
```

*startnptudp*

```
/test/bin/nptd -p2001 -z -r0
/test/bin/nptd -p2002 -z -r0
```

*startnptdelay*

```
/test/bin/nptd -p2005 -z -t0 -d/test/data/2001.log
/test/bin/nptd -p2006 -z -t0 -d/test/data/2002.log
/test/bin/nptd -p2007 -z -t0
/test/bin/nptd -p2008 -z -t0
```

*slay*

```
#!/bin/sh
# kill all /test/bin/nptd lines
ids=`ps -e | fgrep /test/bin/nptd | fgrep -v fgrep| awk '{ print $1 }'`
for id in $ids
do
   kill -30 $id
done
```

*case11d*

```
#!/bin/ksh
rm /test/store/case11d.res
touch /test/store/case11d.res
/test/scripts/stnpt >> /test/store/case11d.res
npt -t0 -hb1ts01 -p2005 -hb1cs01 -p2005 -f/test/data/rt.pay -n100 -
i10000
```

*case11nd*

```
#!/bin/ksh
rm /test/store/case11nd.res
touch /test/store/case11nd.res
/test/scripts/stnpt >> /test/store/case11nd.res
npt -t1 -hb1ts01 -p2001 -hb1cs01 -p2001 -f/test/data/rt.pay -n100 -
i10000
```

*case12d*

```
#!/bin/ksh
rm /test/store/case12d.res
touch /test/store/case12d.res
/test/scripts/stnpt >> /test/store/case12d.res
npt -t0 -hb1ts01 -p2005 -hb1at0102 -p2005 -hb1ts0102 -p2006 -hb1cs01 -
p2006 -f/test/data/rt.pay -n100 -i10000
```

*case12nd*

```
#!/bin/ksh
rm /test/store/case12nd.res
touch /test/store/case12nd.res
/test/scripts/stnpt >> /test/store/case12nd.res
npt -t1 -hb1ts01 -p2001 -hb1at0102 -p2001 -hb1ts0102 -p2002 -hb1cs0101
-p2002 -f/test/data/rt.pay -n100 -i10000
```

*case13d*

```
#!/bin/ksh
rm /test/store/case13d.res
touch /test/store/case13d.res
/test/scripts/stnpt >> /test/store/case13d.res
npt -t0 -hb1ts01 -p2005 -hb1at0102 -p2005 -hb1gd0102 -p2005 -hb1at0102
-p2006 -hb1ts0102 -p2006 -hb1cs0101 -p2006 -f/test/data/rt.pay -n100 -
i10000
```

*case13nd*

```
#!/bin/ksh
rm /test/store/case13nd.res
touch /test/store/case13nd.res
/test/scripts/stnpt >> /test/store/case13nd.res
npt -t1 -hb1ts01 -p2001 -hb1at0102 -p2001 -hb1gd0102 -p2001 -hb1at0102
-p2002 -hb1ts0102 -p2002 -hb1cs0101 -p2002 -f/test/data/rt.pay -n100 -
i10000
```

*case14d*

```
#!/bin/ksh
rm /test/store/case14d.res
touch /test/store/case14d.res
/test/scripts/stnpt >> /test/store/case14d.res
```

```
npt -t0 -hb1ts01 -p2005 -hb1at0102 -p2005 -hb2gd0102 -p2005 -hb1at0102
-p2006 -hb1ts0102 -p2006 -hb1cs0101 -p2006 -f/test/data/rt.pay -n100 -
i10000
```

*case14nd*

```
#!/bin/ksh
rm /test/store/case14nd.res
touch /test/store/case14nd.res
/test/scripts/stnpt >> /test/store/case14nd.res
npt -t1 -hb1ts01 -p2001 -hb1at0102 -p2001 -hb2gd0102 -p2001 -hb1at0102
-p2002 -hb1ts0102 -p2002 -hb1cs0101 -p2002 -f/test/data/rt.pay -n100 -
i10000
```

*case15d*

```
#!/bin/ksh
rm /test/store/case15d.res
touch /test/store/case15d.res
/test/scripts/stnpt >> /test/store/case15d.res
npt -t0 -hb1ss0103 -p2005 -hb1at0103 -p2006 -f/test/data/prov.pay -n100
-i10000
```

*case15nd*

```
#!/bin/ksh
rm /test/store/case15nd.res
touch /test/store/case15nd.res
/test/scripts/stnpt >> /test/store/case15nd.res
npt -t1 -hb1ss0103 -p2001 -hb1at0103 -p2002 -f/test/data/prov.pay -n100
-i10000
```

*case16d*

```
#!/bin/ksh
rm /test/store/case16d.res
touch /test/store/case16d.res
/test/scripts/stnpt >> /test/store/case16d.res
npt -t0 -hb2fe0103 -p2005 -hb1ss0103 -p2006 -f/test/data/prov.pay -n100
-i1000000
```

*case16nd*

```
#!/bin/ksh
rm /test/store/case16nd.res
touch /test/store/case16nd.res
/test/scripts/stnpt >> /test/store/case16nd.res
```

```
npt -t1 -hb2fe0103 -p2001 -hb1ss0103 -p2002 -f/test/data/prov.pay -n100
-i1000000
```

*case17d*

```
#!/bin/ksh
rm /test/store/case17d.res
touch /test/store/case17d.res
/test/scripts/stnpt >> /test/store/case17d.res
npt -t0 -hb2fe0104 -p2005 -hb1ss0104 -p2006 -f/test/data/7mb.pay -n10 -
i10000000
```

*case17nd*

```
#!/bin/ksh
rm /test/store/case17nd.res
touch /test/store/case17nd.res
/test/scripts/stnpt >> /test/store/case17nd.res
npt -t1 -hb2ss0104 -p2001 -hb1ss0104 -p2002 -f/test/data/7mb.pay -n10 -
i10000000
```

*case18d*

```
#!/bin/ksh
rm /test/store/case18d.res
touch /test/store/case18d.res
/test/scripts/stnpt >> /test/store/case18d.res
npt -t0 -hb1ts01 -p2005 -hb1at0102 -p2005 -hb1gd0102 -p2005 -hb1at0102
-p2006 -hb1ts0102 -p2006 -hb1cs0101 -p2006 -f/test/data/rt.pay -n10000
-i1
```

*case18nd*

```
#!/bin/ksh
rm /test/store/case18nd.res
touch /test/store/case18nd.res
/test/scripts/stnpt >> /test/store/case18nd.res
npt -t1 -hb1ts01 -p2001 -hb1at0102 -p2001 -hb1gd0102 -p2001 -hb1at0102
-p2002 -hb1ts0102 -p2002 -hb1cs0101 -p2002 -f/test/data/rt.pay -n10000
-i1
```

*case19d*

```
#!/bin/ksh
rm /test/store/case19d.res
touch /test/store/case19d.res
/test/scripts/stnpt >> /test/store/case19d.res
```

```
npt -t0 -hb1ss0103 -p2005 -hb1at0103 -p2006 -f/test/data/prov.pay -
n10000 -i1
```

*case19nd*

```
#!/bin/ksh
rm /test/store/case19nd.res
touch /test/store/case19nd.res
/test/scripts/stnpt >> /test/store/case19nd.res
npt -t1 -hb1ss0103 -p2001 -hb1at0103 -p2002 -f/test/data/prov.pay -
n10000 -i1
```

*case110d*

```
#!/bin/ksh
rm /test/store/case110d.res
touch /test/store/case110d.res
/test/scripts/stnpt >> /test/store/case110d.res
npt -t0 -hb1ts01 -p2005 -hb1at0102 -p2005 -hb1gd0102 -p2005 -hb1at0102
-p2006 -hb1ts0102 -p2006 -hb1cs0101 -p2006 -f/test/data/rt.pay -n10000
-i1
```

*case110nd*

```
#!/bin/ksh
rm /test/store/case110nd.res
touch /test/store/case110nd.res
/test/scripts/stnpt >> /test/store/case110nd.res
npt -t1 -hb1ts01 -p2001 -hb1at0102 -p2001 -hb1gd0102 -p2001 -hb1at0102
-p2002 -hb1ts0102 -p2002 -hb1cs0101 -p2002 -f/test/data/rt.pay -n10000
-i1
```

*case111d*

```
#!/bin/ksh
rm /test/store/case111d.res
touch /test/store/case111d.res
/test/scripts/stnpt >> /test/store/case111d.res
npt -t0 -hb2fe0103 -p2005 -hb1ss0103 -p2006 -f/test/data/prov.pay -
n10000 -i1
```

*case111nd*

```
#!/bin/ksh
rm /test/store/case111nd.res
touch /test/store/case111nd.res
/test/scripts/stnpt >> /test/store/case111nd.res
```

```
npt -t1 -hb2fe0103 -p2001 -hb1ss0103 -p2002 -f/test/data/prov.pay -
n10000 -i1
```

*case112d*

```
#!/bin/ksh
rm /test/store/case112d.res
touch /test/store/case112d.res
/test/scripts/stnpt >> /test/store/case112d.res
npt -t0 -hb2fe0104 -p2005 -hb1ss0104 -p2006 -f/test/data/7mb.pay -n200
-i1000
```

*case112nd*

```
#!/bin/ksh
rm /test/store/case112nd.res
touch /test/store/case112nd.res
/test/scripts/stnpt >> /test/store/case112nd.res
npt -t1 -hb2fe0104 -p2001 -hb1ss0104 -p2002 -f/test/data/7mb.pay -n200
-i1000
```

*stat541* vmstat >> case541v.result& iostat >> case541i.result& netstat >> case541n.result&

*case541txhigh*

```
#!/bin/ksh
rm /test/store/case541cnd.res
touch /test/store/case541cnd.res
/test/scripts/slay
/test/scripts/stnpt >> /test/store/case541cnd.res
npt -t1 -hb1ss0103 -p2001 -hb1at0103 -p2002 -f/test/data/prov.pay -i65
-n10000 &
npt -t1 -hb1ts0102 -p2003 -hb1at0102 -p2004 -f/test/data/rt.pay -i65 -
n10000 &
```

*stat542* vmstat >> case542v.result& iostat >> case542i.result& netstat >> case542n.result&

*case542rxhighp*

```
#!/bin/ksh
rm /test/store/case542prxnd.res
touch /test/store/case542prxnd.res
/test/scripts/slay
/test/scripts/stnpt >> /test/store/case542prxnd.res
npt -t1 -hb1at0103 -p2001 -hb1ss0103 -p2002 -f/test/data/prov.pay -i65
-n10000
```

*case542rxhighc*

```
#!/bin/ksh
rm /test/store/case542crxnd.res
touch /test/store/case542crxnd.res
/test/scripts/slay
/test/scripts/stnpt >> /test/store/case542crxnd.res
npt -t1 -hb1at0102 -p2003 -hb1ts0102 -p2004 -f/test/data/rt.pay -i65 -
n10000
```

*stat543* vmstat >> case543v.result& iostat >> case543i.result& netstat >> case543n.result&

*case543fdhighp*

```
#!/bin/ksh
rm /test/store/case543fdp.res
touch /test/store/case543fdp.res
/test/scripts/slay
/test/scripts/stnpt >> /test/store/case543fdp.res
npt -t1 -hb1at0103 -p2001 -hb1rs0103 -p2002 -f/test/data/prov.pay -i65
-n100000
```

*case543fdhighc*

```
#!/bin/ksh
rm /test/store/case543fdc.res
touch /test/store/case543fdc.res
/test/scripts/slay
/test/scripts/stnpt >> /test/store/case543fdc.res
npt -t1 -hb1at0102 -p2003 -hb1ts0102 -p2004 -f/test/data/rt.pay -i65 -
n100000
```

*case543fdhigh*

```
#!/bin/ksh
rm /test/store/case543fd.res
touch /test/store/case543fd.res
/test/scripts/slay
/test/scripts/stnpt >> /test/store/case543fd.res
npt -t1 -hb1rs0103 -p2001 -hb1at0103 -p2002 -f/test/data/prov.pay -i65
-n100000 &
npt -t1 -hb1ts0102 -p2003 -hb1at0102 -p2004 -f/test/data/rt.pay -i65 -
n100000 &
```
**npt -hb1ts0102 -p2001 -hb1at0102 -p2002 -f/test/data/rt.pay -i65 >>
/test/store/case543c.result &**

*case5111*

```
#!/bin/ksh
rm /test/store/case5111.res
touch /test/store/case5111.res
/test/scripts/slay
/test/scripts/stnptudp >> /test/store/case5111.res
npt -hb1at0103 -p2001 -hb1ss0103 -p2002 -r0 -f/test/data/rt.pay -i1000
-n100000
```

*case5112*

```
#!/bin/ksh
rm /test/store/case5112.res
touch /test/store/case5112.res
/test/scripts/slay
/test/scripts/stnptudp >> /test/store/case5112.res
npt -hb1at0103 -p2001 -hb1ss0103 -p2002 -r0 -f/test/data/rt.pay -i1000
-n100000
```

*case5121*

```
#!/bin/ksh
```

```
rm /test/store/case5121.res
touch /test/store/case5121.res
/test/scripts/slay
/test/scripts/stnptudp >> /test/store/case5121.res
npt -hb1ss0103 -p2001 -hb1rs0103 -p2002 -r0 -f/test/data/rt.pay -i1000
-n100000
```

*case5122*

```
#!/bin/ksh
rm /test/store/case5122.res
touch /test/store/case5122.res
/test/scripts/slay
/test/scripts/stnptudp >> /test/store/case5122.res
npt -hb1ss0103 -p2001 -hb1rs0103 -p2002 -r0 -f/test/data/rt.pay -i1000
-n100000
```

*case5131*

```
#!/bin/ksh
rm /test/store/case5131.res
touch /test/store/case5131.res
/test/scripts/slay
/test/scripts/stnptudp >> /test/store/case5131.res
npt -hb1ss0103 -p2001 -hb1rs0103 -p2002 -r0 -f/test/data/rt.pay -i1000
-n100000
```

*case5132*

```
#!/bin/ksh
rm /test/store/case5132.res
touch /test/store/case5132.res
/test/scripts/slay
/test/scripts/stnptudp >> /test/store/case5132.res
npt -hb1rs0103 -p2001 -hb1rs0103 -p2002 -r0 -f/test/data/rt.pay -i1000
-n100000
```

*case5141*

```
#!/bin/ksh
rm /test/store/case5141.res
touch /test/store/case5141.res
/test/scripts/slay
/test/scripts/stnptudp >> /test/store/case5141.res
npt -hb1cs0103 -p2001 -hb1ss0103 -p2002 -r0 -f/test/data/rt.pay -i1000
-n100000
```

*case5142*

```
#!/bin/ksh
rm /test/store/case5142.res
touch /test/store/case5142.res
/test/scripts/slay
/test/scripts/stnptudp >> /test/store/case5142.res
npt -hb1cs0103 -p2001 -hb1ss0103 -p2002 -r0 -f/test/data/rt.pay -i1000
-n100000
```

*case5211*

```
#!/bin/ksh
rm /test/store/case5211.res
touch /test/store/case5211.res
/test/scripts/slay
/test/scripts/stnptudp >> /test/store/case5211.res
npt -hb1at0103 -p2001 -hb1ss0103 -p2002 -r0 -f/test/data/rt.pay -i1000
-n100000
```

*case5212*

```
#!/bin/ksh
rm /test/store/case5212.res
touch /test/store/case5212.res
/test/scripts/slay
/test/scripts/stnptudp >> /test/store/case5212.res
npt -hb1at0103 -p2001 -hb1ss0103 -p2002 -r0 -f/test/data/rt.pay -i1000
-n100000
npt -hb1ss0103 -p2001 -hb1rs0103 -p2002 -r0 -f/test/data/rt.pay -i1000
>> /test/store/case5221.result &
```

*case5221*

```
#!/bin/ksh
rm /test/store/case5221.res
touch /test/store/case5221.res
/test/scripts/slay
/test/scripts/stnptudp >> /test/store/case5221.res
npt -hb1ss0103 -p2001 -hb1rs0103 -p2002 -r0 -f/test/data/rt.pay -i1000
-n100000 &
npt -hb1ss0103 -p2001 -hb1rs0103 -p2002 -r0 -f/test/data/rt.pay -i1000
-n100000 &
```
*case5222*

```
#!/bin/ksh
rm /test/store/case5222.res
```

```
touch /test/store/case5222.res
/test/scripts/slay
/test/scripts/stnptudp >> /test/store/case5222.res
npt -hb1ss0103 -p2001 -hb1rs0103 -p2002 -r0 -f/test/data/rt.pay -i1000
-n100000 &
```

*case5231*

```
#!/bin/ksh
rm /test/store/case5231.res
touch /test/store/case5231.res
/test/scripts/slay
/test/scripts/stnptudp >> /test/store/case5231.res
npt -hb1at0103 -p2001 -hb1ss0103 -p2002 -r0 -f/test/data/rt.pay -i1000
-n100000 &
```

*case5232*

```
#!/bin/ksh
rm /test/store/case5232.res
touch /test/store/case5232.res
/test/scripts/slay
/test/scripts/stnptudp >> /test/store/case5232.res
npt -hb1at0103 -p2001 -hb1ss0103 -p2002 -r0 -f/test/data/rt.pay -i1000
-n100000 &
```

*case5241*

```
#!/bin/ksh
rm /test/store/case5241.res
touch /test/store/case5241.res
/test/scripts/slay
/test/scripts/stnptudp >> /test/store/case5241.res
npt -hb1cs0103 -p2001 -hb1ss0103 -p2002 -r0 -f/test/data/rt.pay -i1000
-n100000 &
```

*case5242*

```
#!/bin/ksh
rm /test/store/case5242.res
touch /test/store/case5242.res
/test/scripts/slay
/test/scripts/stnptudp >> /test/store/case5242.res
npt -hb1cs0103 -p2001 -hb1ss0103 -p2002 -r0 -f/test/data/rt.pay -i1000
-n100000 &
```

*adhoc_case*

```
npt -t1 -hb2fe0103 -p2001 -hb1cs01 -p2002 -f/test/data/rt.pay -n50 -
i10000 >> /test/store/case5adhoc.res
```

*cs_adhoc_high_load*

```
#!/bin/ksh
su -c /usr/sbin/netstat -z
rm /test/store/cs_adhoc_high_load.res
/test/scripts/stnpt >> /test/store/cs_adhoc_high_load.res
npt -t1 -hb2gd0101 -p2002 -hb1cs0101 -p2002 -f/test/data/prov.pay -
n20000 -i1
/usr/sbin/netstat -s >> /test/store/cs_netstat.res
```

*test_paths*

```
#! /bin/ksh
# script to test paths to each test server

HOSTNAME=`hostname` system[1]=b1ss01
system[2]=b1ss0103
system[3]=b1ss0104
system[4]=b1gd01
system[5]=b1gd0101
system[6]=b1gd0102
system[7]=b1at01
system[8]=b1at0102
system[9]=b1at0103
system[10]=b1ts01
system[11]=b1ts0101
system[12]=b1ts0102
system[13]=b1cs01
system[14]=b1cs0101
system[15]=b2fe01
system[16]=b2fe0103
system[17]=b2fe0104
system[18]=b2gd01
system[19]=b2gd0101
system[20]=b2gd0102 rm -f test_paths.log
touch test_paths.log
echo "test paths from " $HOSTNAME
echo "test paths from " $HOSTNAME >> test_paths.log integer cnt=1 while [ cnt -le ${#system[*]} ]
do
```

```
  if (ping -c2 ${system[cnt]} >> /dev/null)
  then
    echo "reached " ${system[cnt]}
  else
    echo ${system[cnt]}: " unreachable"
  fi
  cnt=cnt+1
done
```

*trace_paths*

```
#! /bin/ksh
# script to test paths to each test server

HOSTNAME=`hostname`
DATE=`date`
FILE=`echo "/test/store/trace_"$HOSTNAME".log"` system[1]=b1ss01
system[2]=b1ss0103
system[3]=b1ss0104
system[4]=b1gd01
system[5]=b1gd0101
system[6]=b1gd0102
system[7]=b1at01
system[8]=b1at0102
system[9]=b1at0103
system[10]=b1ts01
system[11]=b1ts0101
system[12]=b1ts0102
system[13]=b1cs01
system[14]=b1cs0101
system[15]=b2fe01
system[16]=b2fe0103
system[17]=b2fe0104
system[18]=b2gd01
system[19]=b2gd0101
system[20]=b2gd0102 echo "trace paths from" $HOSTNAME "on" $DATE > $FILE
echo >> $FILE echo "---------- Start trace on" $HOSTNAME "----------"
integer cnt=1 while [ cnt -le ${#system[*]} ]
do
  echo "trace to " ${system[cnt]} >> $FILE
  /usr/sbin/traceroute -m 4 -w 2 ${system[cnt]}; >> $FILE
  echo "----" >> $FILE
  cnt=cnt+1
done
```

What is claimed is:

1. A system for validating a telecommunications call processing network comprising:

a call processing network including a variety of application servers and network devices for simulating handling of call processing traffic along first segregated routes comprising one or more subnets between associated network devices, and handling of call provisioning traffic along second segregated routes comprising one or more subnets; said first and second segregated routes segregated according to call traffic latency requirements, and test tool capable of communicating test information packets along selected segregated routes in said call processing network; and mechanism for measuring round trip latencies of communicated packets along said selected segregated routes, whereby internetwork and intranetwork latency and subnet integrity for simulated packet traffic is verified.

2. The system according to claim 1, wherein said test tool is capable of communicating test packets at traffic load levels of varying severity across said segregated routes, said test tool generating test scripts for generating and communicating packets along selected segregated routes.

3. The system according to claim 1, wherein said mechanism for measuring round trip latencies includes mechanism for applying time stamp information for packets entering a call processing network path during validation test and for comparing timestamps of returned packets to determine the length of a round trip path.

4. The system according to claim 1, further comprising interface for enabling packets to enter said call processing network, said interface including an IP socket interface.

5. The system according to claim 4, wherein said test information packets include TCP and UDP packets.

6. The system according to claim 2, wherein said call processing network comprises:

a first local area network (LAN) including one or more network devices including a first redundant high-speed network device dedicated for handling call traffic processing packets;

second LAN including one or more network devices including a second redundant high-speed network device dedicated for handling call provisioning traffic packets; and a wide area network (WAN) including one or more network devices for handling traffic destined to a second call processing network from said call processing network, said WAN including a router device and a permanent virtual connection (PVC) established for communicating packets to a receiving device at said second call processing network, said segregated routes including one or more of: call processing routes between one or more subnets, call processing routes between said first and second LAN, and call processing routes across said WAN via a selected PVC.

7. The system according to claim 6, wherein said test tool executes scripts for providing worst-case traffic loading for said router and PVC by providing simultaneous real-time, provisioning and statistics packet traffic across said PVC and monitoring packet latency.

8. The system according to claim 6, wherein said test tool includes mechanism for monitoring effect of two redundant high-speed network device interface connections receiving packets from a single application server resource in said call processing network, said monitoring mechanism including measuring CPU utilization of said server resource.

9. The system according to claim 6, wherein said test tool includes mechanism for monitoring failover times for a single component failure in said call processing network, said measuring mechanism including measuring response time before during and after failover under constant traffic loading conditions.

10. The system according to claim 9, wherein said test tool includes mechanism for measuring failback times when a failed component is recovered.

11. The system according to claim 10, wherein said failover monitor mechanism monitors failover times when power is removed from a redundant high-speed network device linked to an application server.

12. The system according to claim 10, wherein said failover monitor mechanism monitors failover times when an application server interface to a redundant high-speed network device is disconnected.

13. The system according to claim 11, wherein said failover monitor mechanism monitors failback times when power is restored to a redundant high-speed network device linked to an application server.

14. The system according to claim 12, wherein said failover monitor mechanism monitors failback times when an application server interface to a redundant high-speed network device is reconnected.

15. A method for validating a telecommunications call processing network comprising the steps of:

interconnecting a variety of application servers and network devices for simulating a call processing network capable of handling call processing traffic along first segregated routes comprising one or more subnets between associated network devices, and handling of call provisioning traffic along second segregated routes comprising one or more subnets; said first and second segregated routes segregated according to call traffic latency requirements, communicating test information packets along selected segregated routes in said call processing network; and measuring round trip latencies of communicated packets along said selected segregated routes, whereby internetwork and intranetwork latency and subnet integrity for simulated packet traffic is verified.

16. The method according to claim 15, wherein said communicating of test packets includes implementing test scripts for generating and communicating packets along selected segregated routes, said generating step including generating packet traffic load levels of varying severity across said segregated routes.

17. The method according to claim 16, wherein said step of measuring round trip latencies includes:

applying time stamp information for packets entering a call processing network path during validation test; and, comparing timestamps of returned packets to determine the length of a round trip path.

18. The method according to claim 15, further comprising providing an interface for enabling packets to enter said call processing network, said interface including an IP socket interface.

19. The method according to claim 16, wherein said interconnecting includes:

providing a first local area network (LAN) including one or more network devices including a first redundant high-speed network device dedicated for handling call traffic processing packets;

providing a second LAN including one or more network devices including a second redundant high-speed network device dedicated for handling call provisioning traffic packets;

providing a wide area network (WAN) including one or more network devices for handling traffic destined to a second call processing network from said call processing network via a router device; and, establishing and a permanent virtual connection (PVC) for communicating packets to a receiving device at said second call processing network, wherein said segregated routes includes one or more of: call processing routes between one or more subnets, call processing routes between said first and second LAN, and call processing routes across said WAN via a selected PVC.

20. The method according to claim 19, further including the step of executing scripts for providing worst-case traffic loading for said router and PVC by providing simultaneous real-time, provisioning and statistics packet traffic across said PVC and monitoring packet latency.

21. The method according to claim 19, further including the step of monitoring effect of two redundant high-speed network device interface connections for receiving packets from a single application server resource in said call processing network, said monitoring mechanism including measuring CPU utilization of said server resource.

22. The method according to claim 19, further including the step of monitoring failover times for a single component failure in said call processing network, said monitoring step including measuring response time before during and after failover under constant traffic loading conditions.

23. The method according to claim 22, further including the step of measuring failback times when a failed component is recovered.

24. The method according to claim 23, further including monitoring failover times when power is removed from a redundant high-speed network device linked to an application server.

25. The method according to claim 23, further including monitoring failover times when an application server interface to a redundant high-speed network device is disconnected.

26. The method according to claim 24, further including monitoring failback times when power is restored to a redundant high-speed network device linked to an application server.

27. The method according to claim 25, further including monitoring failback times when an application server interface to a redundant high-speed network device is reconnected.

* * * * *